(12) United States Patent
Li et al.

(10) Patent No.: US 11,997,019 B2
(45) Date of Patent: May 28, 2024

(54) METHOD, APPARATUS AND SYSTEMS FOR SUPPORTING PACKET DELIVERY

(71) Applicant: HUAWEI TECHNOLOGIES CO., LTD., Shenzhen (CN)

(72) Inventors: Xu Li, Nepean (CA); Chengchao Liang, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 165 days.

(21) Appl. No.: 17/353,982

(22) Filed: Jun. 22, 2021

(65) Prior Publication Data

US 2021/0314266 A1 Oct. 7, 2021

Related U.S. Application Data

(63) Continuation of application No. PCT/CN2020/083022, filed on Apr. 2, 2020.
(Continued)

(51) Int. Cl.
*H04L 47/20* (2022.01)
*H04L 47/2441* (2022.01)
*H04L 69/327* (2022.01)

(52) U.S. Cl.
CPC .......... *H04L 47/20* (2013.01); *H04L 47/2441* (2013.01); *H04L 69/327* (2013.01)

(58) Field of Classification Search
None
See application file for complete search history.

(56) References Cited

U.S. PATENT DOCUMENTS 10,419,982 B1 * 9/2019 Gundavelli ............ H04L 45/34
10,531,420 B2 * 1/2020 Li .......................... H04W 4/60
(Continued)

FOREIGN PATENT DOCUMENTS

CN      109548082 A      3/2019
WO      2018127190 A1    7/2018

OTHER PUBLICATIONS

Huawei et al. TS 23.502 End-Marker during HO Procedure SAWG2 Meeting #122 S2-174546 Jun. 30, 2017 (Jun. 30, 2017) sections 1-2, total 13 pages.
(Continued)

*Primary Examiner* — Gregory B Sefcheck

(57) ABSTRACT

The present invention provides methods, apparatuses and systems supporting in-order packet delivery during application relocation or UP (User Plane) path management events such as DNAI (Data Network Access Identifier) changes. In-order packet delivery may be enforced, ensured or supported by using an indication that in-order packet delivery is requested or required for a particular traffic flow of a UE during a user plane path management event. The methods may be performed by apparatuses implementing an application function (AF), a policy control function (PCF), a session management function (SMF), or UP entities such as PDU session anchors, of the communication network, or systems implementing a combination thereof. The SMF may configure UP entities to transmit packets and flow end markers to support in-order packet delivery and provide flow end marker information to the UP entities. The UP entities may signal path changes using flow end markers.

20 Claims, 8 Drawing Sheets

Related U.S. Application Data

(60) Provisional application No. 62/828,189, filed on Apr. 2, 2019.

(56) References Cited

U.S. PATENT DOCUMENTS

| | | | | |
|---|---|---|---|---|
| 11,419,035 | B2* | 8/2022 | Dannebro | H04W 28/0808 |
| 2008/0240039 | A1* | 10/2008 | Parekh | H04W 36/02 |
| | | | | 370/331 |
| 2011/0255471 | A1* | 10/2011 | Sundell | H04W 36/02 |
| | | | | 370/328 |
| 2013/0215822 | A1* | 8/2013 | Worrall | H04L 47/34 |
| | | | | 370/315 |
| 2016/0127959 | A1* | 5/2016 | Miao | H04W 36/18 |
| | | | | 370/331 |
| 2018/0192471 | A1* | 7/2018 | Li | H04W 8/065 |
| 2018/0199398 | A1* | 7/2018 | Dao | H04W 36/0016 |
| 2019/0007500 | A1 | 1/2019 | Kim et al. | |
| 2019/0109823 | A1* | 4/2019 | Qiao | H04L 47/24 |
| 2019/0158408 | A1* | 5/2019 | Li | H04L 67/104 |
| 2019/0159090 | A1* | 5/2019 | Keller | H04W 36/14 |
| 2019/0200414 | A1* | 6/2019 | Abraham | H04W 76/27 |
| 2019/0261246 | A1* | 8/2019 | Zhu | H04W 40/12 |
| 2019/0261260 | A1* | 8/2019 | Dao | H04W 48/18 |
| 2019/0268818 | A1* | 8/2019 | Yi | H04W 36/0033 |
| 2019/0289508 | A1* | 9/2019 | Gundavelli | H04W 36/0033 |
| 2020/0015138 | A1* | 1/2020 | Zhu | H04W 36/0016 |
| 2020/0252837 | A1* | 8/2020 | Kim | H04M 15/66 |
| 2021/0099943 | A1* | 4/2021 | Dannebro | H04L 67/63 |
| 2021/0211960 | A1* | 7/2021 | Ryu | H04W 36/0011 |
| 2021/0234660 | A1* | 7/2021 | You | H04W 36/0069 |
| 2021/0243826 | A1* | 8/2021 | Hoffmann | H04W 68/005 |
| 2022/0030488 | A1* | 1/2022 | Han | H04L 5/0098 |
| 2022/0132385 | A1* | 4/2022 | Zahemszky | H04W 36/0011 |

OTHER PUBLICATIONS

Huawei et al. TS 23.502 End-Marker during HO Procedure SAWG2 Meeting #122 S2-175645 Jun. 30, 2017 (Jun. 30, 2017) sections 1-2, total 13 pages.

Huawei et al. TS 23.502 End-Marker during HO Procedure SAWG2 Meeting #123 S2-177140 Oct. 27, 2017 (Oct. 27, 2017), sections 1-2, total 13 pages.

Huawei et al. TS 23.502 End-Marker during HO Procedure SAWG2 Meeting #123 S2-177861 Oct. 27, 2017 (Oct. 27, 2017) sections 1-2, total 10 pages.

Huawei et al. TS 23.502 End-Marker during HO Procedure SAWG2 Meeting #123 S2-178059 Oct. 27, 2017 (Oct. 27, 2017), sections 1-2, total 13 pages.

ZTE Corporation Further discussion on End Marker 3GPP TSG RAN WG3#ad-hoc1807 R3-183666 Jul. 6, 2018 (Jul. 6, 2018) the whole document, total 8 pages.

CATT Discussion on End Marker 3GPP TSG-RAN WG3 #NRAdHoc 1807 R3-183798 Jul. 6, 2018 (Jul. 6, 2018) the whole document, total 2 pages.

* cited by examiner

METHOD, APPARATUS AND SYSTEMS FOR SUPPORTING PACKET DELIVERY

CROSS-REFERENCE TO RELATED APPLICATIONS

This application is a continuation of International Application No. PCT/CN2020/083022 filed Apr. 2, 2020 entitled "METHOD, APPARATUS AND SYSTEMS FOR SUPPORTING PACKET DELIVERY" and claims priority of U.S. Provisional Patent Application Ser. No. 62/828,189, entitled "Methods and apparatuses for supporting in-order packet delivery during application relocation" filed Apr. 2, 2019, the contents of which are incorporated herein by reference.

FIELD OF THE INVENTION

The present invention pertains to the field of communication networking and network management systems and in particular to method, apparatus and systems for supporting packet delivery.

BACKGROUND

Edge computing (e.g. mobile edge computing, multi-access edge computing) enables operator and 3rd party services to be hosted close to the user equipment's (UE's) access point of attachment, so as to achieve an efficient service delivery through reduced end-to-end latency and load on the transport network. In an edge computing scenario, applications are deployed inside the data network (DN) at locations close to the end of the network. The locations where applications are deployed may be represented or identified by Data Network Access Identifiers (DNAIs). The Application Function (AF) influence technique allows the AF to influence the Session Management Function (SMF)'s traffic routing decision (e.g. User Plane (UP) path selection and traffic steering on NG interface) by providing potential application locations and subscribing to UP path management or path change events (e.g. DNAI changes). UP path management events may trigger application relocation in the data network (DN).

Further information about the AF's influence on traffic routing can be found in the 3rd Generation Partnership Project (3GPP) Technical Specification (TS) 23.501 ("3rd Generation Partnership Project; Technical Specification Group Services and System Aspects; System Architecture for the 5G System; Stage 2 (Release 16)," V16.0.0, March 2019), clauses 5.6.7 and 5.13, especially for non-roaming and local-break-out (LBO) roaming scenarios.

In some scenarios, applications require in-order delivery of data packets. Application relocations or DNAI changes may cause packets to be delivered out of order. When enforcing in-order delivery, sequence numbering (SN) in the tunneling header (e.g. SN in GTP-U tunnel (GPRS tunneling protocol—user data tunnel) when the GTP-U is used as tunneling protocol in UP) is used for each UP tunnel along the user plane path, or the corresponding mechanism is activated. For each of the UP tunnels, the tunnel end point, a UPF (User Plane Function) or an access node (e.g. radio access node) generates tunnel header with SN to ensure that packets are ordered within the tunnel. When in-order delivery is ensured for each tunnel along the path, end-to-end in-order delivery can be achieved.

When an application is relocated (in the form of DNAI change, DNAI being representing the application location), the connection between the UP (User Plane) and the DN changes. As the two connections (e.g. (i) the old connection connecting the UP with the old or source DNAI and (ii) the new connection connecting the UP with the new or target DNAI) may have different transport performance (e.g. the new connection is faster than the old connection), packets received by the UP from the DN may no longer be in order. For example, referring to FIG. 1, when transmitting packets between the 5GC (5G Core Network) UP and the DN, packets transmitted over the old connection (e.g. DL Pkt1, DL Pkt2 in the downlink (DL) and UL Pkt1, UL Pkt2 in the uplink (UL)) may arrive at the destination later than packet transmitted over the new connection (e.g. DL Pkt3, DL Pkt4 in the downlink (DL) and UL Pkt3, UL Pkt4 in the uplink (UL)) even if the packets transmitted over the old connection start packet transmission earlier than the packets transmitted over the new connection. This is particularly true if the old connection is experiencing congestion or latency issues, thus triggering a transition to the new connection.

If there is no mechanism to reorder application layer packets, the DN or the 5GC (5G Core Network) may not be able to handle the packets properly (e.g. not able to ensure end-to-end in-order delivery). While a PSA (PDU (Protocol Data Unit) Session Anchor) may be relocated (from one UPF to another UPF) for a PDU session serving or transporting traffic/packets for an edge computing application, the PSA relocation may or may not be associated with DNAI change or application relocation. When PSA is not relocated, the source PSA and the target PSA may have same location or identity (e.g. being the same UPF) as indicated by the dashed box 101 in FIG. 1. PSA is a functionality of UPF.

Therefore there is a need for methods and apparatus for ensuring or supporting in-order packet delivery during DNAI change or application relocation, that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide methods, and apparatuses and systems for ensuring or supporting in-order packet delivery to the UE (for DN traffic) and to the DN (for UP traffic) during DNAI change or application relocation. In accordance with embodiments of the present invention, there is provided an apparatus in a communication network implementing a session management function (SMF). The apparatus comprises a processor, a memory and a network interface and is configured to receive an indication that in-order packet delivery is requested for a traffic flow. The apparatus is further configured to receive information related to a flow end marker to be used in supporting said in-order packet delivery. The apparatus is further configured, based on said indication, to configure one or more user plane (UP) entities to support in-order packet delivery during a UP path management event related to the traffic flow. Said configuring comprises providing at least one of the UP entities with said information related to the flow end marker or providing at least one of the UP entities with further information derived from said information related to the flow end marker. A technical effect of this apparatus is that the SMF manages the UP entities, provides them with the flow end marker information, and sets up the in-order packet delivery procedure only for traffic flows which require it. Furthermore, the SMF provides coordination with the AF to manage the procedure.

In some embodiments, the apparatus is further configured to receive subscription information indicating an application function (AF)'s subscription to a notification of the UP path management event, and, in response to the subscription information, transmitting the notification to the AF. A technical effect is that the SMF coordinates with the AF on an as-needed basis and allows the AF to respond as required to perform its role in the in-order packet delivery. In some embodiments, the apparatus may be further configured to receive said information related to the flow end marker in a response, from the AF, to the notification. A technical effect is that the AF can dynamically define the flow end marker when required, based on current information. In some embodiments, said information related to the flow end marker is received from the AF prior to transmitting the notification to the AF. A technical effect is that the AF can set the flow end marker a priori. In some embodiments, the subscription information is received directly or indirectly from the AF. In some embodiments, the indication that in-order packet delivery is requested, the information related to the flow end marker, the subscription information, or any combination thereof are received from the AF without involving a policy control function (PCF). A technical effect is that information transfer does not require intermediate entities. In some embodiments, the indication that in-order packet delivery is requested, the information related to the flow end marker, the subscription information, or any combination thereof are received from the AF indirectly via a policy control function (PCF). A technical effect is that intermediate entities can communicate information according to existing procedures. In some embodiments, the apparatus is further configured to receive one or more rules from the PCF wherein the rules include one or more of: the indication that in-order packet delivery is requested, the information related to the flow end marker, and the subscription information. In some embodiments, the rules are generated by the PCF according to information provided to the PCF by the AF. The information may include one or more of: the indication that in-order packet delivery is requested; the information related to the flow end marker; and the subscription information. In some embodiments, the subscription information is integrated together with or included in a same message as one or both of: the indication that in-order packet delivery is requested; and the information related to the flow end marker. A technical effect is that the amount of messaging is mitigated.

In some embodiments, the indication that in-order packet delivery is requested, the information related to the flow end marker, or both are received from an application function (AF) without involving a policy control function (PCF). In some embodiments, the indication that in-order packet delivery is requested, the information related to the flow end marker, or both are received from the AF indirectly via a policy control function (PCF). In some embodiments, the indication that in-order packet delivery is requested and the information related to the flow end marker are integrated together or included in a same message. In some embodiments, the apparatus is further configured to receive one or more rules from the PCF, wherein said rules include one or more of: the indication that in-order packet delivery is requested; and the information related to the flow end marker.

In some embodiments, the information related to the flow end marker comprises the flow end marker. A technical effect is that the AF can define the flow end marker and the SMF does not need to. In some embodiments, the apparatus is further configured to generate the further information which comprises the flow end marker. A technical effect is that the flow end marker does not necessarily need to be explicitly communicated, allowing more flexibility. In some embodiments, the information related to the flow end marker, the further information, or both, include information based on which the flow end marker is generated. In some embodiments, the UP path management event relates to a change of the user plane path of a protocol data unit (PDU) session. In some embodiments, the UP path management event relates to a change of a PDU session anchor (PSA) for the traffic flow, a change of a Data Network Access Identifier (DNAI) for the traffic flow, or a combination thereof.

In some embodiments, the UP entities include one or more of: a UP entity configured to receive and forward packets from a user equipment (UE); a source PDU unit session anchor (PSA) configured to act as a PSA prior to the UP path management event; and a target PSA configured to act as the PSA following the UP path management event. In some embodiments, configuring the one or more UPF entities to support in-order packet delivery comprises one or more of: configuring a target PDU session anchor (PSA) to buffer packets of the traffic flow associated with a PDU session; configuring the target PSA to receive and forward further packets of the traffic flow associated with the PDU session; configuring a UPF to transmit the flow end marker to a source PSA; and configuring the source PSA to detect the flow end marker and forward the flow end marker to a source network element, to the target PSA or to both. In some embodiments, configuring the one or more UPF entities to support in-order packet delivery includes configuring a target PSA to: buffer received packets for the traffic flow, the traffic flow being associated with a PDU session; detect receipt of the flow end marker; and, upon detecting receipt of the flow end marker, stop buffering said received packets for the traffic flow and forward said received packets previously buffered to a target network element. In some embodiments, the source network element resides in a data network (DN) and is configured to receive UL packets of the traffic flow from the source PSA prior to the UP path management event. In some embodiments, the source network element is identified by a Data Network Access Identifier (DNAI). In some embodiments, the target network element resides in a data network (DN) and is configured to receive UL packets of the traffic flow from the target PSA after the UP path management event. In some embodiments, the source network element and the target network element are a same network element.

In some embodiments, the UP path management event comprises changing from a source network element to a target network element. Each of the source network element and the target network element may receive UL packets of the traffic flow from a same entity of the one or more UPF entities. Configuring the one or more UPF entities may include configuring said same entity to transmit the flow end marker to the source network element and to subsequently transmit UL packets to the target network element.

In accordance with embodiments of the present invention, there is provided an apparatus in a communication network implementing a user plane function (UPF). The apparatus comprises a processor, a memory and a network interface and is configured to receive information from a session management function (SMF). The information is related to a flow end marker for a traffic flow and is instructing the UPF to transmit the flow end marker to a source protocol data unit (PDU) session anchor (PSA). The apparatus is further configured to transmit the flow end marker to the source PSA, according to the information. A technical effect of this apparatus is that the UPF is responsive to implement its role in the in-order packet delivery mechanism on an as-needed basis, and is able to use dynamically defined flow end markers.

In some embodiments, the information related to the flow end marker further instructs the UPF to transmit uplink (UL) packets for the traffic flow to a designated target PSA, said UL packets being received at the UPF after transmitting the flow end marker to the source PSA, the apparatus further configured to transmit the UL packets to the designated target PSA following transmission of the flow end marker to the source PSA. A technical effect is that the in-order packet delivery mechanism is implemented, with packets organized and flow end markers transmitted at appropriate times to enable the mechanism.

In some embodiments, the UL packets and the flow end marker belong to a same traffic flow of a protocol data unit (PDU) session. In some embodiments, some or all of the UL packets are received by the UPF following transmission of the flow end marker to the source PSA. A technical effect is that the traffic flow can continue during a UP path management event while supporting the in-order packet delivery.

In some embodiments, the information related to the flow end marker is further indicative that the UPF is to support in-order packet delivery during a user plane (UP) path management event related to a change of user plane path of a PDU Session for the traffic flow. In some embodiments, the source PSA has received prior packets from the UPF prior to a UP path management event associated with the flow end marker.

In accordance with embodiments of the present invention, there is provided an apparatus in a communication network implementing a user plane function (UPF). The apparatus comprises a processor, a memory and a network interface and is configured to receive information related to a flow end marker associated with a traffic flow. The traffic flow is associated with a protocol data unit (PDU) session. The apparatus is further configured to transmit the flow end marker to a source network element, according to the information. A technical effect of this apparatus is that the UPF is responsive to implement its role in the in-order packet delivery mechanism on an as-needed basis, and is able to use dynamically defined flow end markers.

In some embodiments, the information related to the flow end marker is received from a session management function (SMF). In some embodiments, the information related to the flow end maker may also include information to be used for constructing the flow end maker. In such cases, the apparatus may be further configured to construct the flow end marker according to the information. In some embodiments, the information related to the flow end maker may further include information to be used for detecting the flow end maker in the traffic flow. In such cases, the information related to the flow end marker may be received from another UPF.

In some embodiments, the apparatus implementing the UPF is further configured, following transmission of the flow end marker to the source network element, to transmit further uplink (UL) packets for the traffic flow to a target network element. The target network element may be designated to receive packets of the traffic flow of the PDU session following the UP path management event. In some embodiments, the apparatus implementing the UPF is further configured, following transmission of the flow end marker to the source network element, to transmit further uplink (UL) packets of the traffic flow to a target PDU session anchor (PSA). In some cases, the apparatus may be further configured to transmit the flow end marker to the target PSA following said transmitting further UL packets to the target PSA. Said further configuration may be performed in response to an instruction from a Session Management Function (SMF).

In some embodiments, the information related to the flow end marker indicates that the UPF is to transmit the flow end marker to the source network element and to transmit the further UL packets to a target network element or a target protocol data unit (PDU) session anchor (PSA). The target network element or the target PSA may be designated to receive packets of the traffic flow, where the traffic flow is associated with the PDU session following the UP path management event.

In some embodiments, the UPF is further configured to detect receipt of the flow end marker from another UPF. The flow end marker may be transmitted as part of the traffic flow which belongs to the PDU session. The UPF is further configured to, upon detecting the flow end marker, forward the flow end marker to a target network element or to a target protocol data unit (PDU) session anchor (PSA). The target network element or the target PSA may be designated to receive packets of the traffic flow following the UP path management event.

In some embodiments, the apparatus implementing the UPF is further configured to transmit the flow end marker to the source network element before forwarding uplink data packets of the traffic flow to a target UPF. The uplink data packets may be forwarded after receipt of the information from a Session Management Function (SMF). In some embodiments, the apparatus implementing the UPF is further configured to transmit the flow end marker to the source network element after forwarding uplink data packets of the traffic flow to a target UPF. The uplink data packets may be forwarded after receipt of the information from a Session Management Function (SMF). The target UPF may be a protocol data unit (PDU) session anchor (PSA).

In some embodiments, the UPF is a protocol data unit (PDU) session anchor (PSA). In some embodiments, the source network element has received packets from a source PSA prior to a user plane (UP) path management event associated with the flow end marker. In some embodiments, the source network element resides in a data network (DN) and is configured to receive UL packets from a source PSA prior to the UP path management event. In some embodiments, the source network element is identified by a Data Network Access Identifier (DNAI). In some embodiments, the target network element resides in a data network (DN) and is configured to receive UL packets from a target PSA following to the UP path management event. In some embodiments, the target network element is identified by a Data Network Access Identifier (DNAI).

In accordance with embodiments of the present invention, there is provided an apparatus in a communication network implementing a user plane function (UPF). The apparatus comprises a processor, a memory and a network interface and is configured to receive information from a session management function (SMF). The information is related to a flow end marker for a traffic flow. The apparatus is further configured to detect receipt of the flow end marker from a source UPF. The apparatus is further configured, upon detection of the flow end marker, to forward, toward a target network element, packets of the traffic flow of a PDU session which are received and buffered by the UPF. The apparatus is further configured to forward further packets of the traffic flow toward the target network element after forwarding all of the packets of the traffic flow which are received and buffered by the UPF. A technical effect of this apparatus is that the UPF is responsive to implement its role in the in-order packet delivery mechanism on an as-needed basis, and is able to use dynamically defined flow end markers. Also, in-order packet delivery is supported while the traffic flow continues.

In some embodiments, the information related to the flow end marker is further indicative that the UPF is to support in-order packet delivery during a UP path management event related to a change of path for a protocol data unit (PDU) session. In some embodiments, the apparatus implementing the UPF is further configured, prior to detecting receipt of the flow end marker, to receive and buffer said packets received from the source UPF. In some embodiments, the further packets of the traffic flow are received from another user plane function (UPF). In some embodiments, the packets of the traffic flow which are received and buffered by the UPF are received from the source UPF, another UPF, or a combination thereof. In some embodiments, the source UPF is a protocol data unit (PDU) session anchor (PSA). In some embodiments, the UPF is a protocol data unit (PDU) session anchor (PSA).

In some embodiments, the UPF is configured to buffer said packets of the traffic flow, to receive and forward said further packets of the traffic flow, or both, based on a configuration signal received from the SMF. A technical effect is that the UPF procedure supporting in-order packet delivery is controllable by the SMF. In some embodiments, some or all of said further packets are received at the UPF prior to forwarding all of the packets of the traffic flow which are received and buffered by the UPF, or some or all of said further packets are received at the UPF after forwarding all of the packets of the traffic flow which are received and buffered by the UPF, or a combination thereof. A technical effect is that the in-order packet delivery procedure is supported for a variety of timings of flow end marker receipt.

In some embodiments, the target network element resides in a data network (DN) and is configured to receive UL packets from a target PSA following to the UP path management event. In some embodiments, the target network element is identified by a Data Network Access Identifier (DNAI).

In accordance with embodiments of the present invention, there is provided a system for supporting in-order packet delivery in a communication network. The system includes a first apparatus implementing a session management function (SMF) as described above. The system further includes one or more of the UP entities which are configured by the SMF. The one or more UP entities of the system may include a first UP entity configured to: receive information from the SMF. The information is related to the flow end marker, the information instructing the first UP entity to transmit the flow end marker to a second UP entity. The first UP entity is further configured, according to the information, to transmit the flow end marker to the second UP entity. The second UP entity may be a source protocol data unit (PDU) session anchor (PSA) and may also be part of the system. The second UP entity may be configured to receive further information related to the flow end marker, the flow end marker associated with a traffic flow. The traffic flow is associated with a protocol data unit (PDU) session. The second UP entity may further be configured, according to the information, to transmit the flow end marker to a source network element.

The one or more of the UP entities in the system may additionally or alternatively include a further UP entity, such as a target UP entity. The further UP entity is configured to receive information from the session management function (SMF). The information is related to the flow end marker which is associated with a traffic flow. The traffic flow is associated with a protocol data unit (PDU) session. The further UP entity is further configured to detect receipt of the flow end marker from a source UP entity (e.g. the second UP entity). The further UP entity is further configured, upon detection of the flow end marker, to forward, toward a target network element, packets of the traffic flow which are received and buffered by the source UP entity. The further UP entity is further configured, after forwarding all of the packets of the traffic flow which are received and buffered by the further UP entity, to forward further packets of the traffic flow toward the target network element.

Technical effects of the above-described system include that the system provides for coordination and dynamic configuration of UP entities by causing the SMF portion of the system to configure the UP entities, and causing the UP entities to respond appropriately to the configuration. The system includes multiple ones of the necessary functions or entities in a communicatively and cooperatively coupled arrangement, thus providing an integrated solution to in-order packet delivery support.

In accordance with embodiments of the present invention, there are provided methods for supporting in-order packet delivery in a communication network. The methods correspond to configurations of apparatuses and systems described above implementing a session management function, a user plane function, or a combination thereof.

In accordance with embodiments of the present invention, there are provided transitory or non-transitory computer readable media storing instructions executable in one or more processors, the instructions when executed in the one or more processors causing operations for performing one or more methods as set forth above.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
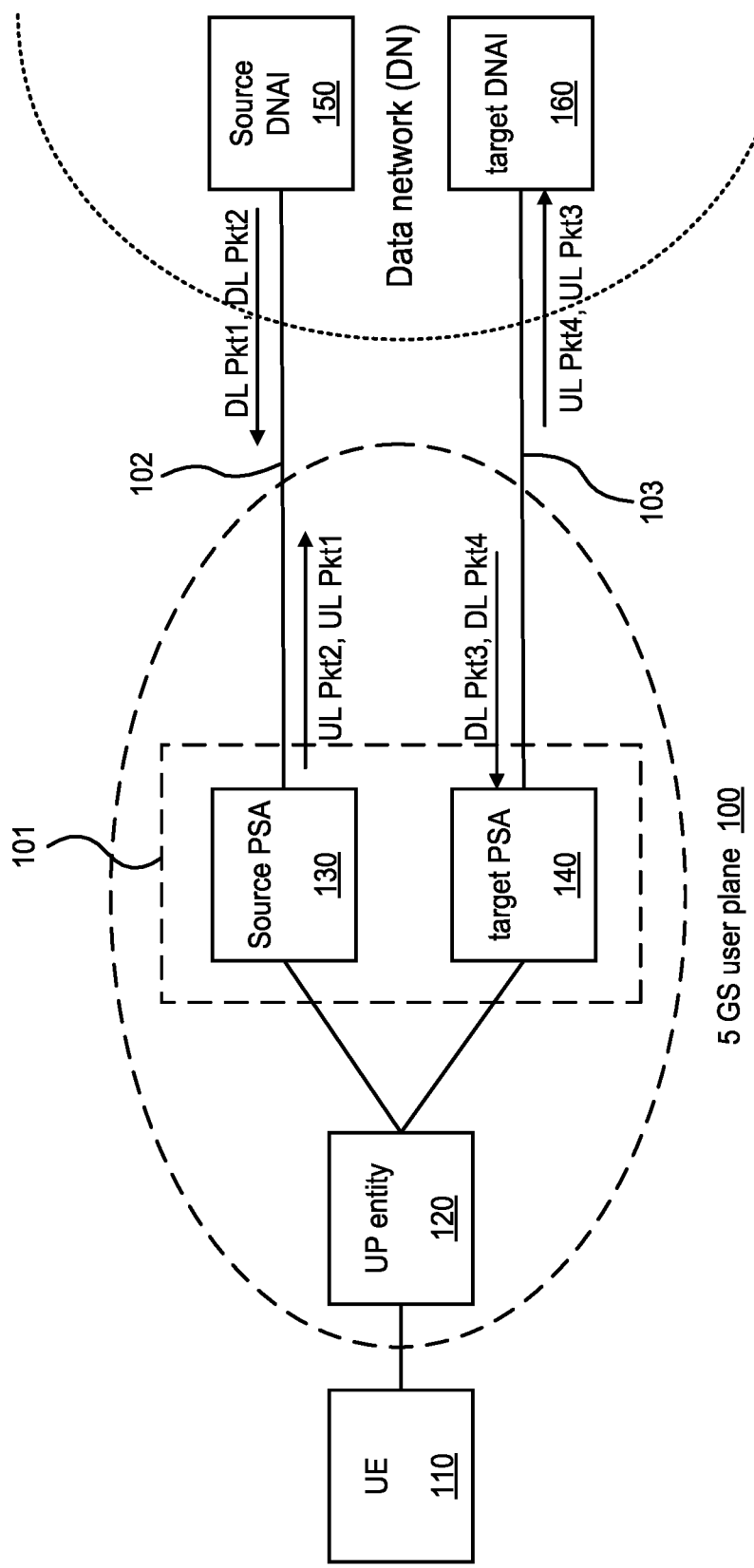
FIG. 1 illustrates a user plane path (of a PDU Session) between the UE and the DN with a DNAI change or application scenario which is handled according to embodiments of the present invention.

Unless defined otherwise, all technical and scientific terms used herein have the same meaning as commonly understood by one of ordinary skill in the art to which this invention belongs.

In the instant application, it is assumed that the User Plane (UP) tunnel (including tunnels used for forwarding packets) support in-order delivery. The connection between the 5GC UP and the data network (DN) is referred to as N6 connection in 3GPP standard term. It is also assumed that the N6 connection supports in-order delivery.

In the instant application, it is assumed that the User plane function (UPF) includes the following functionality. Some or all of the UPF functionalities may be supported in a single instance of a UPF.

- Anchor point for Intra-/Inter-RAT mobility (when applicable).
- Allocation of UE IP address/prefix (if supported) in response to SMF request.
- External PDU Session point of interconnect to Data Network.
- Packet routing & forwarding (e.g. support of Uplink classifier to route traffic flows to an instance of a data network, support of Branching point to support multi-homed PDU Session).
- Packet inspection (e.g. Application detection based on service data flow template and the optional PFDs received from the SMF in addition).
- User Plane part of policy rule enforcement, e.g. Gating, Redirection, Traffic steering).
- Lawful intercept (UP collection).
- Traffic usage reporting.
- QoS Quality of Service (QoS) handling for user plane, e.g. UL/DL rate enforcement, Reflective QoS marking in DL.
- Uplink Traffic verification (SDF (service data flow) to QoS Flow mapping).
- Transport level packet marking in the uplink and downlink.
- Downlink packet buffering and downlink data notification triggering.
- Sending and forwarding of one or more "end marker" to the source NG-RAN node.
- Functionality to respond to Address Resolution Protocol (ARP) requests and/or IPv6 Neighbour Solicitation requests based on local cache information for the Ethernet PDUs. The UPF responds to the ARP and/or the IPv6 Neighbour Solicitation Request by providing the MAC address corresponding to the IP address sent in the request.
- Packet duplication in downlink direction and elimination in uplink direction in GTP-U layer.
- TSN Translator functionality to hold and forward user plane packets for de-jittering when 5G System is integrated as a bridge with the TSN network.

It may be noted that not all of the UPF functionalities are required to be supported in an instance of user plane function of a Network Slice.

In the instant application, it is also assumed that PDU Session Anchor (PSA) is a functionality of a UPF. When a UPF acts as an external PDU Session point of interconnect to the Data Network for a PDU Session, it is a PSA of the PDU Session. The connection between the PSA and the DN is an N6 connection.

In the instant application, it is assumed that the Policy Control Function (PCF) includes one or more of the following functionalities:

- Supports unified policy framework to govern network behaviour.
- Provides policy rules to Control Plane function(s) to enforce them.
- Accesses subscription information relevant for policy decisions in a Unified Data Repository (UDR).

It may be also assumed that the PCF accesses the UDR located in the same PLMN as the PCF. The details of the PCF functionality are defined in clause 6.2.1 of 3GPP TS 23.503 ("3rd Generation Partnership Project; Technical Specification Group Services and System Aspects; Policy and Charging Control Framework for the 5G System; Stage 2 (Release 16)," V16.0.0, March 2019).

In the instant application, it is assumed that the Session Management function (SMF) includes the following functionality. Some or all of the SMF functionalities may be supported in a single instance of a SMF:

- Session Management e.g. Session Establishment, modify and release, including tunnel maintain between UPF and AN node.
- UE IP address allocation & management (including optional Authorization). The UE IP address may be received from a UPF or from an external data network.
- DHCPv4 (server and client) and DHCPv6 (server and client) functions.
- Functionality to respond to Address Resolution Protocol (ARP) requests and/or IPv6 Neighbour Solicitation requests based on local cache information for the Ethernet PDUs. The SMF responds to the ARP and/or the IPv6 Neighbour Solicitation Request by providing the MAC address corresponding to the IP address sent in the request.
- Selection and control of UP function, including controlling the UPF to proxy ARP or IPv6 Neighbour Discovery, or to forward all ARP/IPv6 Neighbour Solicitation traffic to the SMF, for Ethernet PDU Sessions.
- Configures traffic steering at UPF to route traffic to proper destination.
- Termination of interfaces towards Policy control functions.
- Lawful intercept (for SM events and interface to LI System).
- Charging data collection and support of charging interfaces.
- Control and coordination of charging data collection at UPF.
- Termination of SM parts of NAS messages.

Downlink Data Notification.

Initiator of AN specific SM information, sent via AMF over N2 to AN.

Determine SSC mode of a session.

Support for Control Plane CIoT 5GS Optimisation.

Support of header compression.

Act as I-SMF in deployments where I-SMF can be inserted, removed and relocated.

Provisioning of external parameters (Expected UE Behaviour parameters or Network Configuration parameters).

Roaming functionality:

Handle local enforcement to apply QoS SLAB (VPLMN).

Charging data collection and charging interface (VPLMN).

Lawful intercept (in VPLMN for SM events and interface to LI System).

Support for interaction with external DN for transport of signalling for PDU Session authentication/authorization by external DN.

Instructs UPF and NG-RAN to perform redundant transmission on N3/N9 interfaces.

It may be noted that not all of the functionalities are required to be supported in an instance of a Network Slice. In addition to the functionalities of the SMF described above, the SMF may include policy related functionalities as described in clause 6.2.2 in 3GPP TS 23.503 V16.0.0.

In the instant application, it is assumed that the Application Function (AF) interacts with the 3GPP Core Network in order to provide services, for example to support one or more of the following:

Application influence on traffic routing.

Accessing Network Exposure Function.

Interacting with the Policy framework for policy control.

It may be also assumed that based on operator deployment, Application Functions considered to be trusted by the operator can be allowed to interact directly with relevant Network Functions. Application Functions not allowed by the operator to access directly the Network Functions may use the external exposure framework via the NEF to interact with relevant Network Functions. The functionality and purpose of Application Functions may be only defined with respect to their interaction with the 3GPP Core Network.

The present invention provides methods and apparatuses for ensuring or supporting in-order packet delivery to the UE (for DN traffic) and to the DN (for UP traffic) during DNAI change or application relocation.

FIG. 1 illustrates a user plane path (of a PDU Session) between the UE and the DN with a DNAI change or application scenario which is handled according to embodiments of the present invention. In the Data Network, a change from source DNAI 150 to target DNAI 160 occurs, for example corresponding to an application relocation event. Prior to the change, the UE communicates with the source DNAI 150, whereas after the change the UE communicates with the target DNAI 160. A corresponding change from source PSA 130 to target PSA 140 may also occur in the 5GS (5G System) user plane 100. Alternatively, the source PSA 130 and target PSA 140 may be identical (indicated by box 101). In this case, there is no PSA change. Regardless, the UE communicates with the PSA 140 via at least one UP entity (e.g. UP entity 120), which is unchanged. The path involving the source PSA 130 and source DNAI 150 is also referred to as the "old" path (e.g. old path 102), also referred to as the old connection, whereas the path involving the target PSA 140 and target DNAI 160 is also referred to as the "new" path (e.g. new path 103), also referred to as the new connection.

The source PSA and the target PSA are examples of user plane entities, also referred to as user plane functions. When a source PSA or target PSA is indicated, it is understood that a different user plane function can perform the related functions instead. The source DNAI and the target DNAI are example identifiers of data network elements (e.g. source data network elements, target data network elements), typically residing in a data network. For example, the source data network element can be identified with a source DNAI and the target data network element can be identified with a target DNAI. The source DNAI and target DNAI may represent locations of data network elements. The data network elements can implement operations of an application which is associated with the traffic flow. As such, the source DNAI may represent a first location of an application associated with the traffic flow, and the target DNAI may represent a second location of the application associated with the traffic flow. The application location may migrate from the first location to the second location in accordance with the UP path management event. In some cases, the source DNAI, the target DNAI, or both may refer to locations in the same or different data centers or access points associated with the same or different data centers. When a source DNAI or target DNAI is indicated, it is understood that a data network element associated with a different type of identifier can perform the related functions instead. It is noted that, when the term "DNAI" is used herein, other network elements or identifiers of network elements can be substituted for DNAI, and the term is intended to include suitable such substitutions.

The AF may inform the network that packets of a traffic flow (e.g. packets in the UL or DL related to an application) of a UE should be delivered in order (e.g. in the same order that packets are received). In other words, the AF may inform the network that in-order packet delivery is preferred, required or requested for the traffic flow. In accordance with the AF's information (or notification), the network may enforce or support in-order packet delivery for the traffic flow. This may be implemented by enhancing the AF influence mechanism, for example as is illustrated in the 3GPP TS 23.501 V16.0.0, clause 5.6.7. The enhancement of the AF influence mechanism may take place where the AF provides policy requirements (in the form of AF request) to the PCF for influencing the SMF's routing decision. The policy requirements provided by the AF may be delivered to the PCF directly, via NEF (Network Exposure Function), or via NEF and UDR (Unified Data Repository).

In some embodiments, the AF request (e.g. indicative of the policy requirements) sent to the PCF may include information indicating that in-order packet delivery is preferred, required or requested for a traffic flow of a UE. In other words, the information in the AF request may indicate that packets of the traffic flow should be delivered or forwarded in the order that the packets are received. In some cases, the traffic flow may be identified by an application ID which corresponds to a traffic filter pre-configured in the network. In some cases, the traffic flow may be identified by a traffic filter included in the AF request, or otherwise referred to in the AF request. The traffic filter included in the AF request may describe the traffic flow using fields (e.g. 5 tuple (source IP, destination IP, source port, destination port, protocol)) and field values of the packet header. The UE may be identified by information such as UE ID (e.g. GPSI (Generic Public Subscription Identifier) or SUPI (Subscriber Permanent Identifier)), UE address (e.g. IP address, MAC address), or UE group ID (e.g. external group ID or internal group ID). When the UE is identified by a UE group ID, the UE may be a member of the UE group identified by the UE group ID.

In accordance with the AF request, information associated with the AF request, or both, the PCF may generate or update policy rules and send the generated or updated policy rules to a relevant SMF. The relevant SMF may be an SMF serving a PDU session impacted by or related to the AF request. A PDU session may be impacted by or related to the AF request in that, for example, (i) the PDU session belongs to the UE identified in the AF request or (ii) a traffic flow carried (or transported) by the PDU session corresponds to or matches the traffic flow identified in the AF request, or both (i) and (ii). The policy rules may indicate that in-order packet delivery is requested, required or preferred (e.g. as indicated by the AF in the AF request) for the traffic flow. If the policy rules include such an indication, the SMF, based on the indication, other information in the policy rules, or both, may enforce or support in-order packet delivery for the related traffic flow along the UP path of the PDU session.

In some embodiments, the AF may use an AF response to indicate in-order packet delivery is requested, required or preferred for a traffic flow of a UE to the network (e.g. the SMF). As described in 3GPP TS 23.501 V16.0.0, clause 5.6.7, the SMF may send notifications of UP path management event (e.g. DNAI change event) to the AF in accordance with the AF's subscription to the UP path management event notifications. The UP path management event notifications may be referred to as SMF notifications. When the AF receives a UP path management event notification (or an SMF notification) from the SMF, the AF may send a response or an acknowledgement to the SMF. This response or acknowledgement may be referred to as AF response. When the SMF notification is related to DNAI changes, the AF may send a positive AF response or a negative AF response. The communication between the SMF and the AF can take place directly or via the NEF, as described in 3GPP TS 23.501 V16.0.0, clause 5.6.7.

The positive AF response may indicate that the application layer is ready at the target DNAI, and the negative AF response may imply the application relocation, for example due to the DNAI change, cannot be completed successfully or cannot be finished on time.

In the positive AF response, the AF may include information indicating that in-order packet delivery is preferred, required or requested for the traffic flow related to or impacted by the DNAI change. Based upon the information in the AF response indicating preference or need of in-order packet delivery, the SMF may determine to enforce or support in-order packet delivery for the traffic flow during DNAI change.

The positive AF response may also include information, such as an application ID or traffic filter that identifies the traffic flow. However, in some cases, the traffic flow may be identified by the information in the AF's subscription to the UP path management event notification (or the SMF notification). In that case, the positive AF response may not include information identifying the traffic flow explicitly.

According to embodiments, the SMF may enforce or support in-order packet delivery for a traffic flow during DNAI change. For example, the SMF may implement or enforce or support in-order packet delivery according to the preference or need of in-order packet delivery informed by the AF as described above. The SMF's enforcement or support for in-order packet delivery may require use of one or more per-traffic flow end markers which may be negotiated between the 5GC and the AF. How the SMF enforces or supports in-order packet delivery for a traffic flow during DNAI change is further described below.

An end marker is a special packet used in the UP (User Plane) to indicate end of (data packet) transmission of traffic. For UL (uplink) traffic, an end marker may be referred to as a UL end marker. Similarly, for DL (downlink) traffic, an end marker may be referred to as a DL end marker. In various embodiments, an end marker may be identified by or using an end marker descriptor. The end marker descriptor may include information regarding what the end marker looks like or how a packet can be identified, recognized or constructed as the end marker. For example, an end marker descriptor may indicate what field(s) in the packet header is (are) used to indicate or identify the end marker and what value(s) in the field(s) would indicate that the packet is an end marker. In some cases, multiple fields in the packet header may be used to identify the end marker. For example, the multiple fields may be used in combination to identify whether the packet is an end marker. When the packet has more than one header, the field(s) identifying the end marker may belong to one or more different headers.

When an end marker is associated with information (such as an application ID (e.g. an application ID referring to a pre-defined or pre-configured traffic filter) or a traffic filter) illustrating or identifying a traffic flow, the end marker may be used to indicate end of transmission of the traffic flow in user plane transmission. In such cases, the traffic filter may be specified using one or more fields of the packet header with specific field values or specific field value masks in those fields. To identify the end marker, the end marker descriptor may use one or more fields in the packet header that were not used to specify the traffic filter. The fields used for the end marker descriptor may have specific field values in each field to indicate or to identify the end marker. For example, a traffic filter may use a 'destination address' field and 'source address' field in order to illustrate or identify a traffic flow between a UE and an application server. Specifically, the values in the 'destination address' field and the 'source address' field may illustrate or identify the traffic flow. As the 'destination address' field and the 'source address' field are used to illustrate or identify the traffic flow, the end marker of the traffic flow may not be identified using the 'destination address' field or the 'source address' field. As such, the end marker of the traffic flow may be identified, for example, using the 'protocol type' field (in case of the IP traffic flow) or 'Ethernet type' field (in case of the Ethernet traffic flow) in the packet header. Similar to the case of the traffic flow, value of the 'protocol type' field or the 'Ethernet type' field may illustrate or identify the end marker of the traffic flow. A packet may be the end marker of the traffic flow if the packet matches the traffic filter and complies with the end marker descriptor (e.g. the 'protocol type' field or the 'Ethernet type' field in the packet header has a special field value indicating the end marker of the traffic flow or the end of transmission of the traffic flow).

In some embodiments, end marker descriptors and information identifying or indicative of relevant traffic flows (e.g. traffic filter) may use one or more fields of the packet header in common. The fields used to carry information indicative of end markers may partially or fully overlap with the fields used to carry information indicative of traffic flows. The shared use of the packet header may occur when the end marker descriptor embeds the traffic filter. In this case, value in the overlapping part of the commonly used field may correspond to the associated information illustrating or identifying the traffic flow (e.g. traffic filter). Moreover, the shared use of the packet header may occur when the end marker overrides the values for the traffic filter in the overlapping parts. In this case, the value in the overlapping part of the commonly used field may be handled as exception in the traffic flow and recognized as an indication of end marker of the traffic flow.

According to embodiments, a flow end marker may be negotiated by the network (e.g. 5GC) and the AF using the enhanced AF influence mechanism. A flow end marker may mean an end marker of a traffic flow.

The AF may define the flow end marker and provide information about the flow end marker (e.g. end marker descriptor, direction (UL or DL) of the corresponding traffic flow) to the network using an AF request or AF response. AF request and AF response are described above in embodiments related to indication of in-order packet delivery. The network may change or modify the flow end marker defined by the AF in the AF request and provide information about the modified end marker (e.g. modified flow end marker descriptor) to the AF via an SMF notification. The SMF notification is described above and may be the UP path management event notification (e.g. a notification for DNAI change sent from the SMF to the AF, according to the AF's subscription to such notifications, as described in 3GPP TS 23.501 V16.0.0, clause 5.6.7).

Alternatively, the network (e.g. the SMF) may define the flow end marker and provide information about the flow end marker (e.g. flow end marker descriptor, direction (UL or DL) of the corresponding traffic flow) to the AF via an SMF notification. The information about the flow end marker may include the flow end marker descriptor and its associated information (e.g. application ID, traffic filter) identifying the corresponding traffic flow. The information about the flow end marker may be used by the network (e.g. the SMF) to generate packet detection rules for detecting the end marker of the traffic flow (e.g. the flow end marker). The information about the flow end marker may be used by the network (e.g. the SMF, or the UPF) to generate or construct the flow end marker for transmission.

The negotiation (as described above) for the flow end marker may be carried out separately or together with the indication of in-order packet delivery. Negotiation for the indication of in-order packet delivery is described elsewhere in this application. In some embodiments, the negotiation for the flow end marker (e.g. the AF including information on flow end marker in AF request or AF response) may imply or indicate that in-order packet delivery is requested, required or preferred for the traffic flow that the flow end marker is associated with or corresponds to. In such case, the indication that the in-order packet delivery is requested, required or preferred for the corresponding traffic flow may be optionally included in the AF request or AF response (e.g. the AF may not provide the indication in AF request of AF response).

According to embodiments, during DNAI change or application relocation, in-order packet delivery may be achieved or supported for a traffic flow in the user plane by using a flow end marker. The flow end marker may be constructed by the SMF and provided by the SMF to the UPF for transmission. The SMF obtains information on the flow end marker as described above, in embodiments related to negotiation for the flow end marker.

In case that the traffic flow is a UL traffic flow, packets of the traffic flow may be delivered to the DN (e.g. as received cooperatively and collectively by the source DNAI and target DNAI) by the network (e.g. as transmitted via the source PSA and target PSA cooperatively and collectively) in the order that the network receives the UL packets from the UE, as illustrated below.

According to embodiments, during DNAI change (e.g. when implementing a DNAI change (reselection) decision made by the SMF), immediately before switching the routing of the UL traffic flow from toward the source DNAI to toward the target DNAI, the PSA is configured or instructed by the SMF to send an UL end marker toward the source DNAI. The UL end marker sent toward the source DNAI may indicate that no more packets of the UL traffic flow will be routed to the source DNAI afterwards. The PSA may be configured by the SMF to send subsequent UL packets of the traffic flow from the UE to the target DNAI. By using the UL end marker, the application side may be able to reorder the packets received by the source DNAI and the packets received by the target DNAI. For example, the packets received by the source DNAI before the UL end marker may precede the packets received by the target DNAI.

If PSA relocation happens at the same time as DNAI change, a forwarding tunnel may be established between the source PSA and the target PSA. Then, using the established forwarding tunnel, packets of the UL traffic flow arriving at the source PSA may be forwarded by the source PSA to the target PSA. The source PSA may be configured or instructed by the SMF to send the UL end marker to the source DNAI immediately before starting the traffic forwarding.

It is noted that, here and elsewhere, PSA relocation does not necessarily occur in all embodiments and instances. That is, in some cases only the DNAI may change. As such, in FIG. 1 box 101 indicates that, if PSA relocation does not occur, switching of routing from toward source PSA to toward target PSA will not happen, and consequently the traffic forwarding between them will not occur. The UP entity (e.g. RAN node or a UPF, which is shared by or common in the new UP path through the target PSA and the old UP path through the source PSA and is closest to the source PSA and the target PSA) may be configured by the SMF to send the UL end marker to the source PSA along the old UP path, immediately before switching UP path to the target PSA. The source PSA may also be configured to forward the UL end marker to the target PSA using the forwarding tunnel. The UL end marker may be the last packet being forwarded to the target PSA from the source PSA. The target PSA may be configured by the SMF to forward UL packets arriving through the new path. The target PSA may be configured to forward the UL packets only after it receives the UL end marker from the source PSA. This ensures the target PSA to forward UL packets in order (e.g. in the same order that the UL packets is forwarded by the UP entity). For further clarity, the UP entities may be configured to support in-order delivery. UP entities and UPFs are used interchangeably herein. The UP entities may be configured to transmit the UL end marker to a source PSA. As referred to above, the UL packets and UL end markers may be part of a traffic flow. The traffic flow is part of or is associated with a PDU session. When an UL packet is forwarded, it is understood that the packet is also received, detected as part of the traffic flow, or both. Furthermore, additionally or alternatively to the source PSA being configured to forward the UL end marker to the target PSA, the source PSA may be configured to forward the UL end marker to a source data network element (e.g. associated with a source DNAI).

If the target PSA receives the UL packets of the traffic flow through the new path before receiving the UL end marker from the source PSA, the target PSA may be configured by the SMF to buffer the UL packets until it receives the UL end marker. The SMF may configure the target PSA to buffer the packets in this manner by providing the target PSA with rules or instructions. For example, the SMF may provide the target PSA with corresponding packet detection rules, forwarding action rules, or both. The target PSA may be configured by the SMF to detect receipt of the UL end marker and, upon detecting receipt of the UL end marker, to stop buffering said received packets for the traffic flow and forward said received packets previously buffered to a target data network element. Detecting receipt of the UL end marker may comprise detecting the UL end marker among received packets.

In the DN side, the source DNAI may hand over the application (e.g. application for processing the UL traffic flow) to the target DNAI only after the source DNAI receives the UL end marker from the source PSA. The source DNAI may expect to receive the UL end marker according to the AF's instruction. The AF's instruction may be provided to the source DNAI prior to the AF's response to the SMF notification.

In case that the traffic flow is a DL traffic flow, DL packets of the traffic flow coming from the DN (source DNAI and target DNAI operating cooperatively and collectively) may be delivered to the UE by the network (e.g. source PSA and target PSA operating cooperatively and collectively) in the order that the network receives the DL packets from the DN, as illustrated below.

According to embodiments, the source DNAI, for example as instructed by the AF, may send a DL end marker to the PSA in order to indicate that no more DL packets of the traffic flow will be transmitted from the source DNAI. The DL end marker may be sent immediately before the target DNAI takes effect (or the target DNAI takes over the source DNAI) for the traffic flow in communication with the UE. The PSA may be configured by the SMF to send or forward along the UP path toward the UE DL packets of the traffic flow received from the target DNAI only after receiving the DL end marker (from the source DNAI). This ensures that the PSA forwards DL packets of the traffic flow in order (e.g. in the order that the packets leave the source DNAI and the target DNAI operating cooperatively and collectively).

If PSA relocation happens at the same time as DNAI change, a forwarding tunnel may be established between the source PSA and the target PSA. Then, using this established forwarding tunnel, the DL packets of the traffic flow arriving from the source DNAI before the DL end marker at the source PSA may be forwarded by the source PSA to the target PSA. The DL end marker may be the last packet that the source PSA forwards to the target PSA for the DL traffic flow. The target PSA may be configured by the SMF to forward DL packets of the traffic flow transmitted from the target DNAI. The target PSA may be configured to forward the DL packets only after the target PSA receives the DL end marker from the source PSA for the traffic flow. If the target PSA receives the DL packets from the target DNAI before receiving the DL end marker from the source PSA, the target PSA may be configured by the SMF to buffer the DL packets until it receives the DL end marker. The SMF may configure the target PSA to do so by providing the target PSA with rules or instructions such as packet detection rules, or forwarding action rules, or both.

Immediately before the target PSA starts forwarding packets of the traffic flow received from the source DNAI, the source PSA may send the DL end marker in the DL along the old UP path. The UP entity may be configured by the SMF to forward packets of the DL traffic flow arriving from the target PSA along the new UP path. The UP entity may be a RAN node or a UPF, which is shared by or common in the "new" UP path through the target PSA after relocation and the "old" UP path through the source PSA before relocation, and which is closest to the source PSA and the target PSA. The UP entity may be configured to forward the DL packets only after it receives the DL end marker transmitted by the source PSA along the old UP path. The UP entity may be configured to support in-order delivery. The UP entity may be configured to transmit the DL end marker to a source PSA. If the UP entity receives the DL packets from the target PSA before receiving the DL end marker from the source PSA, the UP entity may be configured by the SMF to buffer the DL packets until it receives the DL end marker. The SMF may configure the UP entity to do so by providing the UP entity with rules or instructions such as packet detection rules, or forwarding action rules, or both. The SMF may configure the target PSA to buffer, receive and forward DL packets of the traffic flow. The traffic flow is part of or is associated with a PDU session. The SMF may configure the source PSA to detect the DL end marker and forward the DL end marker to a source data network element, to the target PSA or to both. The SMF may configure the target PSA to detect receipt of the DL end marker and, upon detecting receipt of the DL end marker, to stop buffering said received packets for the traffic flow and forward said received packets previously buffered to a target data network element.

Embodiments of the present invention address an issue of packet loss false positives due to application relocations (also referred to as edge relocations) or DNAI changes. As mentioned previously, during such a relocation, the connection (e.g. an N6 connection) between the UP and the DN changes. Because the new connection and the old connection have different transport paths, new packets (i.e. packets transmitted via the new connection) may arrive earlier than old packets (i.e. packets transmitted via the old connection). When reliable communication is being enforced or implemented (e.g. in an upper layer), if the old packets do not arrive within a certain timeout window, the upper layer may consider the old packets lost. This may be the case even when the old packets arrive immediately after the timeout. The reliable communication is assumed in this case to be enforced or implemented in an upper layer in the protocol stack, for example the Quic protocol layer when Quic is used. Such a packet loss false positive can trigger unnecessary packet retransmissions in the upper layer, which can cause additional delay in packet transmission and resource usage inefficiencies. This can be mitigated by setting a larger timeout window to tolerate late packet arrival. However, large timeout windows are also problematic as the upper layer has to be on hold for the entire window even if there are no old packets at all. In both cases, latency in data transmission can increase and continuity of the upper layer service would be undermined.

According to embodiments of the present invention, the problem of packet loss false positives may be mitigated by supporting in-order packet delivery during edge relocation (which is referred to as application relocation elsewhere in the current application and is related to DNAI change). In particular, the aspect of potential improvements of the coordination of change of the edge application server and (local) PSA is addressed to support seamless change (e.g. preventing or reducing packet loss).

According to embodiments of the present invention, the AF influence on traffic routing (for example as described in TS 23.501, clause 5.6.7) is enhanced to support in-order packet delivery during application (edge) relocation. For example, the AF may be involved by subscribing to notifications of application relocation, with a reply (response) from the AF required to implement mechanisms as described herein. The AF may also be involved in defining or determining the flow end marker to be used. Accordingly, when needed, the 5GC (i.e. the network) and the AF can negotiate a flow end marker (i.e. an end marker of a traffic flow) to be used during application (edge) relocation. The flow end marker may be negotiated between the AF and the entity in the control plane (e.g. SMF) of the network. The flow end marker can be used for marking the end of a transmission of the traffic flow from a given entity in the user plane of the network. The determined flow end marker can be sent using the old connection (e.g. N6 connection in the user plane) prior to the relocation to mark or indicate end of transmission of the traffic flow over the old connection. Using the flow end marker to coordinate packet transmissions, the DN can arrange packets to be delivered to upper layer in their proper original order. For example, packets arriving from the new connection may be transmitted only after detecting the flow end marker over the old connection, or in other words, packets arriving or received from the old connection precede those arriving or received from the new connection when being delivered to the upper layer.

In various embodiments, it is assumed that individual UP tunnels support in-order packet delivery. This may be achieved for example by activating GPT-U in-order packet delivery. In various embodiments, it is further assumed that the N6 implementation (i.e. implementation of N6 connection) supports in-order packet delivery. When the AF sends an AF request for subscription (also referred to as AF subscription) to notifications of UP path change (DNAI change), the AF may include, in the AF request, an indication that AF acknowledgement is expected, or an indication that in-order packet delivery is requested, required or preferred, or both. The indication that in-order packet delivery is requested, required or preferred demonstrates in-order packet delivery to be implemented during application (edge) relocation. The term "requested" in this context is considered to be synonymous with "required, preferred, or needed" for purposes of this specification. The indication that in-order packet delivery is requested can also be referred to as an indication to support in-order packet delivery. The PCF may include those indications in the AF request in the policy rules generated based on the AF request and sent to the SMF. The indications may be part of the AF subscription information, which may be included in the policy rules. The policy rules may be generated or updated in the form of PCC rules. The policy rules can further include information indicative of the flow end marker. In some embodiments, the PCF may generate the policy rules according to information provided to the PCF by the AF including one or more of an indication that in-order packet delivery is requested, required or preferred or needed, information indicative of the flow end marker, and the subscription information (indicating a subscription to notifications of UP path change events such as DNAI change)).

According to the AF subscription information (information about the AF subscription) in the policy rule (e.g. PCC rules) received from the PCF, the SMF may notify the AF about a UP path change (i.e. DNAI change) and wait for a response from the AF. The AF subscription information may include an indication that AF acknowledge is expected, or an indication that in-order packet delivery is requested, required or preferred, or both. In a positive response sent from the AF to the SMF for the notification, the AF includes flow end marker information (e.g. end marker descriptor described elsewhere in the current application). According to flow end marker information in the AF response, the SMF generates the flow end marker and provides the flow end marker to the UP entity or the UPF (e.g. Uplink Classifier (UL CL)) when configuring or activating the new UP path.

The SMF configures the UP entity (e.g. UPF), the source PSA and target PSA to handle the flow end marker by providing these entities with rules or instructions. According to the configuration (rules or instructions), the UP entity (e.g. UPF) sends the flow end marker to the source PSA before switching to the new UP path toward the target DNAI for routing the traffic flow, and the source PSA forwards the flow end marker to both the source DNAI and the target PSA. According to the configuration (rules or instructions), the target PSA buffers data packets (e.g. UL packets) received from the UPF. According to the configuration (rules or instructions), the target PSA sends the data packets to the new (e.g. N6) connection only after receiving the flow end marker from the source PSA.

The flow end marker when being sent to the source DNAI indicates that no more packets of the corresponding traffic flow are to be routed to the source DNAI. The flow end marker can trigger the DN side to finalize the application (edge) relocation. For example, packets received over the new (e.g. N6) connection can be buffered at the target DNAI. After reception of the flow end marker, the source DNAI can inform the target DNAI to stop packet buffering. The target DNAI then routes the packets to the application. The interaction between the source DNAI and the target DNA may go through the AF. Methods to finalize edge relocation may be implementation-specific.

Figure 2:
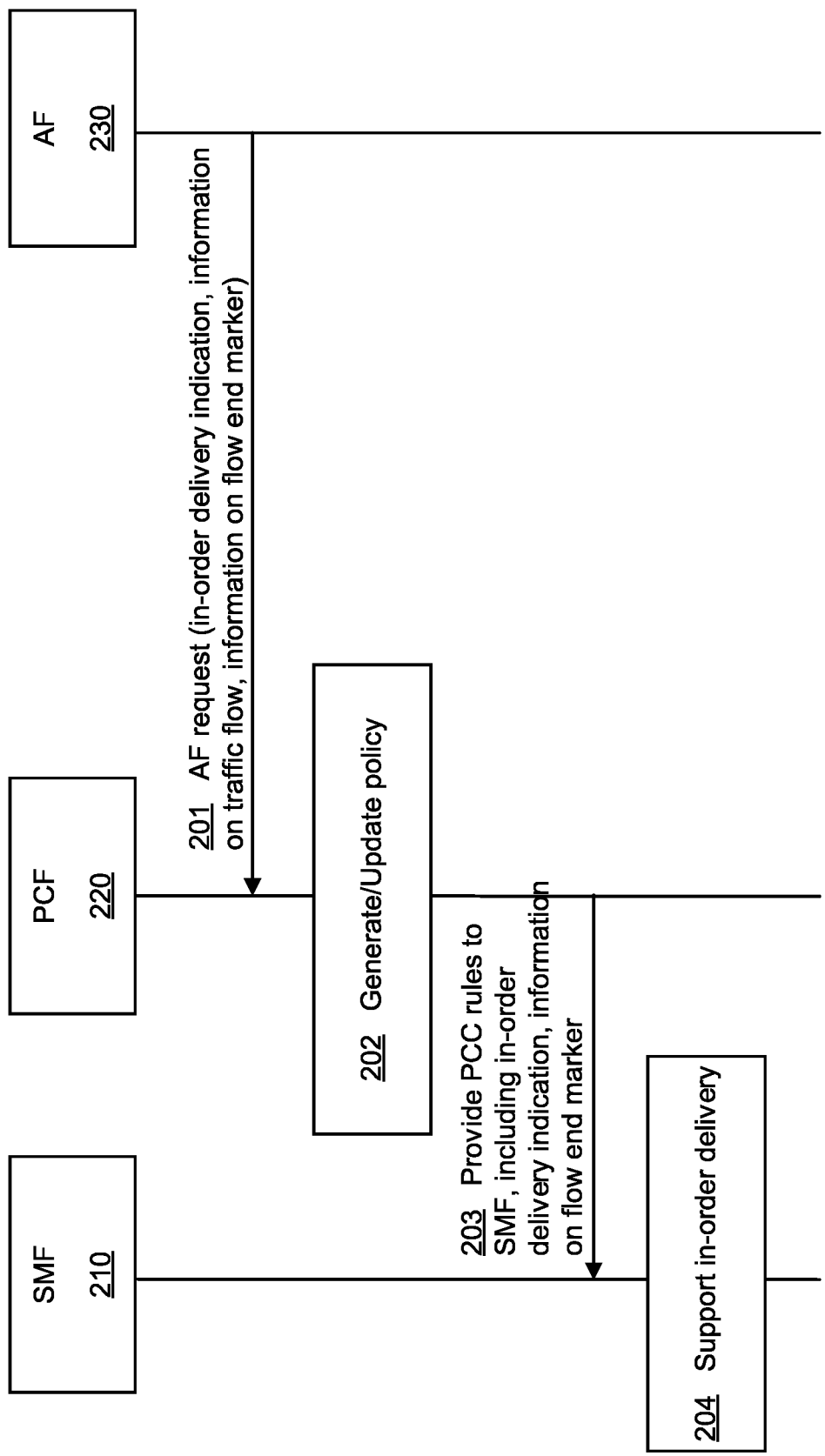
FIG. 2 illustrates, in a message flow diagram, an example procedure of negotiation for in-order packet delivery via AF request, in accordance with embodiments of the present invention.

FIG. 2 illustrates an example procedure of negotiation for in-order packet delivery via AF request, in accordance with embodiments of the present invention.

At step 201, the AF 230 may send a request (e.g. AF request) for influencing the SMF 210's routing decision, subscribing to notifications of UP path management events (e.g. path changes or DNAI changes) or both. The AF request or the information associated with the AF request may be delivered to relevant PCF(s) (e.g. the PCF 220) using the mechanisms described in the 3GPP TS 23.501 V16.0.0, 3GPP TS 23.502 ("3rd Generation Partnership Project; Technical Specification Group Services and System Aspects; Procedures for the 5G System; Stage 2 (Release 15)," V16.0.0, March 2019), or both. The AF request or the information associated with the AF request may be delivered to relevant PCF(s) directly or indirectly via NEF or via NEF and UDR.

In the AF request, the AF 230 may provide an indication that in-order packet delivery is requested, required or preferred for a traffic or traffic flow. The traffic flow may be a UL traffic flow or a DL traffic flow and may be considered to be associated with the indication that in-order packet delivery is requested, required or preferred. The traffic flow may be identified by information such as application ID, traffic filter (e.g. 5 Tuple (source IP, destination IP, source port, destination port, protocol)) or both application ID and traffic filter in the AF request. The network (e.g. the SMF 210) may provide support for in-order delivery of data packets of the traffic flow, in accordance with this indication. The AF may also provide an indication that an AF acknowledgement is to be expected.

When the indication is made for a UL traffic flow, the UL traffic flow may be the traffic flow to be routed to the application (e.g. a selected DNAI or an application location among many potential DNAIs or locations specified in the AF request). When the indication is made for a DL traffic flow, the DL traffic flow may be transmitted from the application (e.g. a selected DNAI or an application location among many potential DNAIs or locations specified in the AF request) and may be also routed to the UE(s). In either case, information identifying the traffic flow (e.g. an application ID or a traffic filter) may be included in the AF request. As described in the 3GPP TS 23.501 V16.0.0, clause 5.6.7, information to be contained in the AF request may include one or more of traffic description (e.g. application ID, traffic/packet filter, DNN, S-NSSAI, AF-Service Identifier), potential locations of applications, target UE identifier(s) or address, UE group identifier, spatial validity condition, AF transaction identifier, traffic routing requirements (e.g. routing profile ID, N6 traffic routing information for each potential location of application, indication of application relocation possibility, indication of UE IP address preservation, temporal validity condition and information on AF subscription (e.g. notification type).

In some embodiments, the AF 230 may provide two such indications, one for a UL traffic flow and the other for a DL traffic flow. Both traffic flows may be identified by information included in the AF request, as described above.

In the AF request, the AF 230 may provide information about the flow end marker (e.g. end marker descriptor) for the traffic flow that the indication for the in-order packet delivery is associated with. The traffic flow may be identified by information in the AF request and can be a UL traffic flow or a DL traffic flow. The information about the flow end marker may be or may include a flow end marker descriptor which demonstrates or describes how a packet (e.g. data packet) may be constructed, identified or recognized as an end marker. The network (e.g. the SMF 210) may use this information to generate packet detection rules for detecting the flow end marker in user plane traffic. The network (e.g. the SMF 210 or the UPF) may use this information to generate or construct the flow end marker for transmission. If the flow end marker is generated or constructed by the SMF, the SMF may provide the flow end marker to the UPF for transmission.

In some embodiments, the in-order packet delivery indication is not explicitly provided. In other words, the in-order packet delivery may be indicated implicitly without using a dedicated information element. For example, when information about the (flow) end marker is included in the AF request for the traffic flow, it may be implied that in-order packet delivery is requested, required or preferred for the traffic flow. (In the following steps, in-order packet delivery indication is provided regardless of whether the in-order packet delivery indication is provided explicitly or implicitly.)

In step 202, the PCF 220 may generate or update policy rules based upon or in accordance with one or more of the AF request, information in the AF request, and information associated with the AF request. Here, the AF request may be a request sent by the AF 230 at step 201 for PDU session(s) related to or impacted by such request.

According to embodiments, the policy rules may be generated or updated in the form of PCC rules and may include the in-order packet delivery indication(s) provided by the AF 230 at step 201. The policy rule may further include information associated to the in-order packet delivery indication(s), such as information about the flow end marker(s) (e.g. end marker descriptor(s), direction (UL or DL) of the corresponding traffic flow(s)). In some cases, the information about the flow end marker(s) may be the raw data provided by the AF 230 at step 201. In some other case, the information may be processed (or translated, or mapped) information upon analyzing the raw data. The information processing may be performed by the NEF (now shown in FIG. 2) or the PCF 220. In some embodiments, the policy rules may be generated by the PCF 220 based on information provided to the PCF 220 by the AF 230. The information provided to the PCF 220 includes one or more of an indication that in-order packet delivery is requested (or required or preferred or needed), information indicative of the flow end marker, and the subscription information (indicating a subscription to notifications of UP path change events such as DNAI change).

In step 203, the PCF 220 may provide the generated or updated policy rules to the SMF(s) 210 serving the PDU Session(s) (e.g. the PDU Sessions that are related to or impacted by the AF request).

More generally, whether indicated to do so via the PCF or directly via the AF, or via a combination thereof, the SMF is configured to receive and respond to an indication that in-order packet delivery is requested for a traffic flow. The indication can be for a particular traffic flow during a particular UP path management event, for example. Along with or separately from the indication, the SMF may receive information indicative of a flow end marker. As is described elsewhere herein, the flow end marker is used to support the in-order packet delivery during the UP path management event.

In step 204, the SMF 210 may proceed to enforce, ensure or support in-order packet delivery for the traffic flow if the policy rules received at step 203 include an indication of in-order packet delivery for the traffic flow. The in-order packet delivery may be supported using information included in the policy rules such as in-order packet delivery indication(s) and information about the flow end marker (e.g. flow end marker descriptor(s), direction (UL or DL) of the corresponding traffic flow(s)).

For example, enforcing, ensuring or supporting in-order packet delivery can include configuring one or more user plane (UP) entities. This can include prompting the UP entities to implement a particular packet handling behaviour as described elsewhere herein. This can include handling packets for a traffic flow by appropriate buffering and forwarding, and transmitting and monitoring for flow end markers as appropriate. Enforcing, ensuring or supporting in-order packet delivery can include providing at least one of the UP entities with the flow end marker or information based upon which the flow end marker can be constructed. This can be the same as the information received by the SMF, or different information.

A technical effect of these actions by the SMF is that the SMF manages the UP entities, provides them with the flow end marker information, and sets up the in-order packet delivery procedure only for traffic flows which require it. Furthermore, the SMF provides coordination with the AF to manage the procedure.

According to embodiments, information on flow end marker (e.g. end marker descriptor) may be dynamically negotiated by the network (e.g. SMF) and the AF, for example during DNAI change or application relocation. The dynamic negotiation for the end marker information may be required or needed when the definition or construction of end marker relies on dynamic information that is not available when the AF sends request to the PCF (e.g. at step 201 in FIG. 2). Such dynamic information may include UE address, port number related to the target DNAI or the application in the DN, or both.

Figure 3:
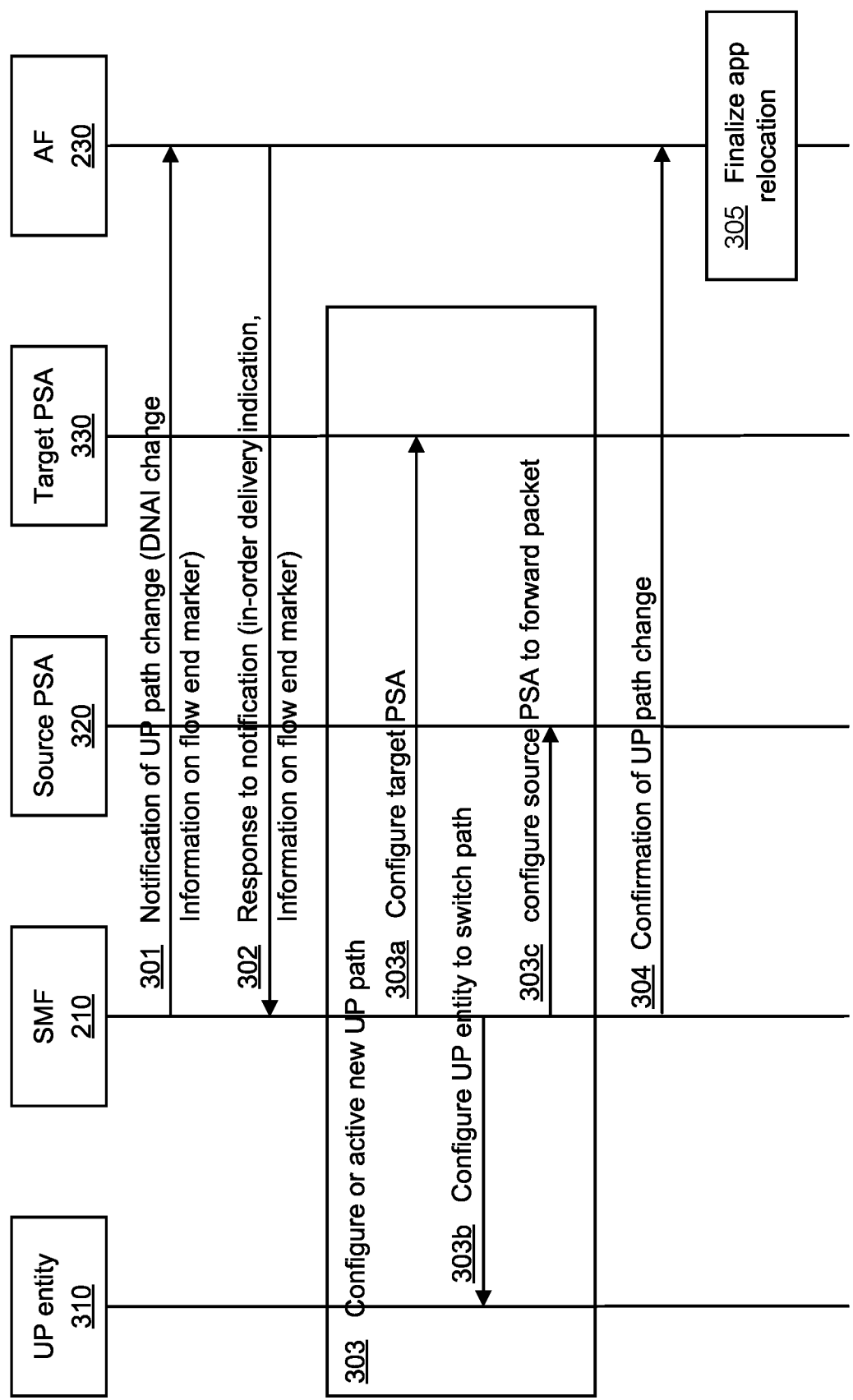
FIG. 3 illustrates, in a message flow diagram, an example procedure of dynamic negotiation for in-order packet delivery via SMF notification, AF response, or both SMF notification and AF response, in accordance with embodiments of the present invention.

FIG. 3 illustrates an example procedure of a dynamic negotiation for in-order packet delivery via SMF notification, AF response or both SMF notification and AF response, in accordance with embodiments of the present invention. The AF may have subscribed to notification of UP path management/change events (e.g. DNAI changes) for a traffic flow of the UE. The traffic flow of the UE may be transported by a PDU Session of the UE. The PDU Session may be served by the SMF 210. The subscription may be created or performed through the steps illustrated in FIG. 2.

According to embodiments, the SMF 210 may know about the AF 230's subscription based on the policy rules received from the PCF for the PDU Session, as is illustrated in step 203 in FIG. 2.

Each step regarding dynamic negotiation for flow end marker information via SMF notification, AF response, or both SMF notification and AF response illustrated in FIG. 3 will be described below in three different scenarios. In the following description and in FIG. 3, the UP entity 310 may be a common element in the new UP path and the old UP path that is closest to the source PSA 320 and the target PSA 330. The UP entity 310 may be the (R)AN node serving the UE or a UPF (which may be the UPF acting as the source PSA, or the UPF acting as the target PSA, or a different UPF). Information about flow end marker may include end marker descriptor described above and may indicate direction of the traffic flow (e.g. UL or DL) that the end marker is associated with. The traffic flow may be a UL flow or a DL flow.

Generally speaking, for the three scenarios discussed below, information indicative of the flow end marker (and possibly other implementation information) is indicated either by the AF, the SMF, or a combination thereof. This information can be communicated separately from (and typically after) the indication from the AF that in-order packet delivery is requested, required or preferred for a given flow. Alternatively, this information can be communicated concurrently (e.g. in the same message or signal) as the indication from the AF. In some embodiments, the AF may initially subscribe to notifications from the SMF, and may later transmit the above-mentioned indication and the above-mentioned information on flow end marker, either together or separately.

The first scenario for dynamic negotiation corresponds to a situation in which the SMF provides information about the flow end marker in the notification sent to the AF (e.g. AF 230). In this scenario, the AF has (previously) provided an indication of in-order packet delivery for a traffic flow in the AF request (e.g. the AF request illustrated in step 201 in FIG. 2). The traffic flow may be a UL flow or a DL flow.

According to embodiments, if information about the flow end marker for the traffic flow is not provided in the AF request (e.g. step 201 in FIG. 2), the SMF may generate or define or determine the flow end marker for the AF to use. For example, the SMF may generate or define the flow end marker by including information about the end marker in the SMF notification as described below. If the information about end marker for the traffic flow is provided in the AF request (e.g. step 201 in FIG. 2), the SMF may change or modify the flow end marker defined or determined by the AF and send the updated information about the end marker back (as part of the SMF notification as described below) to the AF to use.

Referring to FIG. 3, the SMF 210, at step 301, may notify the AF 230 of the UP path change (e.g. a change from a source DNAI to a target DNAI) for the UE. The SMF 210 may notify the AF after it performs UP path reselection (including DNAI reselection) for the PDU Session and the traffic flow, according to the relevant policy rules. The policy rules may include information about the AF's subscription to SMF notifications (e.g. indicative of UP path management/ change events such as DNAI changes) and may be received from the PCF as illustrated in step 203 in FIG. 2.

According to embodiments, the SMF 210's notification may include information indicating one or more of the UE, the source DNAI, and the target DNAI. The SMF notification may include information that allows the AF 230 to identify the corresponding request of the AF that subscribes to the SMF notification. The AF request may include the application ID or information of the traffic filter that identifies the traffic flow (e.g. the traffic flow identified in the AF request in the step 201 of FIG. 2). The traffic flow may be related to the SMF notification.

The SMF notification may include information about the end marker (e.g. end marker descriptor) for the traffic flow. The information about the flow end marker may describe or instruct how to construct or detect the end marker for the traffic flow. As mentioned above, the end marker can be for an UL or DL traffic flow.

According to embodiments, in the case that the traffic flow is a UL traffic flow, the flow end marker is a UL end marker, and the information about the flow end marker may be used by the AF or the application side in order to detect the UL end marker received from the network. In the case that the traffic flow is a DL traffic flow, the flow end marker is a DL end marker, and the information about the flow end marker may be used by the AF or the application side in order to generate the DL end marker to be transmitted to the network.

At step 302, the AF 230 may respond to the SMF 210, i.e. in response to the notification received at step 301. The AF 230's response may be a positive response which indicates that the application layer is ready, for example at the target DNAI, in the DN side.

More generally, the SMF receives subscription information indicating the AF's subscription to a notification of the UP path management event, and in response, notifies the AF of the UP path management (path change) event. In various embodiments, the subscription information is received directly or indirectly from the AF (e.g. AF 230). The UP path management event may relate to a change of the user plane path of a protocol data unit (PDU) session. The UP path management event may further relate to the traffic flow, for example a change of a PDU session anchor (PSA) for the traffic flow, a change of a Data Network Access Identifier (DNAI) for the traffic flow, or a combination thereof. A technical effect related to the SMF notification action is that the SMF coordinates with the AF on an as-needed basis and allows the AF to respond as required to perform its role in the in-order packet delivery. When the AF transmits an indication of or information about the flow end marker in response to the notification, a technical effect is that the AF can dynamically define the flow end marker when required, based on current information. When the AF transmits an indication of or information about the flow end marker to the SMF prior to or without such a notification, a technical effect is that the AF can define the flow end marker a priori, thus expediting the set-up process. For example, the SMF can receive a single message incorporating multiple information elements, such as the indication that in-order packet delivery is requested, and the flow end marker information (i.e. information or indication of the flow end marker). This mitigates the amount of messaging. The information or indication of the flow end marker may be in the form of flow end marker descriptor. Flow end marker descriptor is described elsewhere herein.

In some cases, the indication of or information about the flow end marker can be the flow end marker itself, which allows the AF to act alone to define the flow end marker. In some cases, the indication of or information about the flow end marker can be information based upon which the flow end marker can be generated. For example, the indication may be a reference to a pre-configured flow end marker or in the form of a flow end marker descriptor. This avoids the requirement to explicitly communicate the flow end marker and adds flexibility to the system.

If the AF transmits the indication that in-order packet delivery is requested (or required or preferred or needed), the subscription information, or the indication of (or information about) flow end marker directly to the SMF without involving a policy control function (PCF), a technical effect is that intermediate entities such as the PCF are neither involved nor required, thus information transfer occurs through a shorter path without involving PCF. Further, the information transfer process can be simplified and system response delay would be reduced. Otherwise, the above information can be transmitted to the SMF via intermediate entities such as a PCF, NEF, or both. In this case, a technical effect is that the intermediate entities can communicate information according to existing architectures or procedures. A further technical effect is that the AF is allowed to provide the above information to the network (i.e. PCF) before the SMF being selected. For example, the AF can provide the above information before establishment of the PDU Session. At that time, no SMF is being selected as SMF is selected per PDU session.

If the AF 230's response received by the SMF 210 at step 302 is a positive response, the SMF 210, at step 303, may configure or activate the new UP path toward the target DNAI. (e.g. If the AF 230's response is positive, the SMF 210, at step 303, may configure the new UP path, activate the new UP path, or configure and activate the new UP path.) In general, the step 303 may include configuring entities such as the UP entity, source PSA and target PSA to act in a manner that retains packet ordering during a relocation event. Actions may include transmitting and receiving end markers, buffering packets, forwarding packets, and transmitting buffered packets. Packets may be buffered and subsequently transmitted at times and in an order that preserves the original packet ordering. Details regarding how packet ordering is preserved are presented elsewhere herein. The step 303 is further illustrated in component steps 303a, 303b and 303c as follows.

At step 303a, the SMF 210 may configure the target PSA 330 in order to detect and forward the traffic flow related to the DNAI change.

In particular for UL traffic(s) (e.g. when that the traffic flow is a UL traffic flow; UL traffic(s) refer to the packets of the UL traffic flow, and the flow end marker is a UL end marker), the SMF 210 may configure the target PSA 330 in order to detect the UL end marker (i.e. the flow end marker). The configuration may include that the SMF 210 provides the target PSA 330 with packet detection rules to be applied against UL PDUs for detecting the UL end marker. The packet detection rules may be generated by the SMF 210 based upon or using the information about the UL end marker. The SMF 210 may receive information about the UL end marker (e.g. end marker descriptor, direction of the traffic flow (e.g. traffic flow is UL)) from the AF 230, either directly or indirectly (e.g. via the PCF 220, as described above in the embodiments related to FIG. 2).

The SMF 210 may further provide the target PSA 330 with instructions for the follow-up activities upon detection of the UL end marker. Specifically, upon detection of the UL end marker forwarded from the source PSA 320, the target PSA 330 may stop buffering UL traffic received directly from the UP entity 310 (as opposed to UL traffic forwarded from the source PSA 320) and may also start forwarding the UL traffic to the target DNAI, in accordance with the instruction provided by the SMF 210. In various embodiments, the instructions may be in the form of packet forwarding rules linked to the packet detection rules described above.

Moreover, the SMF 210 may configure the target PSA 330 in order to forward the UL traffic received from the source PSA 320 to the target DNAI. For this, packet detection rules (e.g. packet detection rules for detecting the UL traffic) and packet forwarding rules (e.g. packet forwarding rules for forwarding the UL traffic to the target DNAI) may be provided to the target PSA 330. The SMF 201 provides these rules to the target PSA 330.

For DL traffic(s) (e.g. when the traffic flow is a DL traffic flow, DL traffic(s) refer to packets of the DL traffic flow, and the flow end marker is a DL end marker), the SMF 210 may configure the target PSA 330 to detect the DL end marker (i.e. the flow end marker). For the configuration, the SMF 210 may provide the target PSA 330 with packet detection rules for detecting the DL end marker. The packet detection rules may be generated by the SMF 210 based upon (using) information about the DL end marker. The SMF 210 may also provide the target PSA 330 with packet forwarding rules to forward the DL end marker properly. The SMF 210 may configure the target PSA 330 to take proper follow-up actions upon detection of the DL end marker. The follow-up activities may include stopping buffering DL traffic received from the target DNAI and starting forwarding the DL traffic along the new UP path in the DL.

The SMF 210 may, if necessary, further configure the target PSA 330 for forwarding the DL traffic (e.g. data traffic; not end marker) received from the source PSA 320 to the UP entity 310. This may include providing the target PSA 330 with packet detection rules for detecting the DL traffic and packet forwarding rules for forwarding the DL traffic to UP entity 310.

At step 303b, the SMF 210 may configure the UP entity 310 to switch the UP path from the source PSA 320 to the target PSA 330 for the traffic flow. Upon configuring the switching of the UP path, the SMF 210 may further configure the UP entity to send the UL end marker to the source PSA 320 through the old UP path connected to the source PSA 320 in the UL direction. The UL end marker may inform the source PSA 320 that no more UL packets of the traffic flow will be transmitted through the old path. The SMF 210 may provide the UL end marker to the UP entity 310 for transmission. In various embodiments, the UL end marker or information about the UL end marker (e.g. information on how the UL end marker can be constructed) may be used for the configuration or included in the configuration (i.e. when the SMF configures the UP entity 310 to send the UL end marker).

Moreover, for example for DL traffic(s) (e.g. when that the traffic flow is a DL traffic flow, DL traffic(s) refer to packets of the DL traffic flow, and the flow end marker is a DL end marker), the SMF 210 may further configure the UP entity 310 to detect and handle the DL end marker (i.e. the flow end marker). For configuration, the SMF 210 may provide the packet detection rules for detecting the DL end marker and the packet handling rules for managing the DL end marker. The packet detection rules for detecting the DL end marker may be generated by the SMF 210 based on or using information about DL end marker. The SMF 210 may receive information about the DL end marker (e.g. end marker descriptor, direction of the traffic flow (e.g. traffic flow is DL)) from the AF 230 directly (i.e. without the PCF 220 acting as intermediary) or indirectly (i.e. via the PCF 220), as described elsewhere in the application. The SMF 210 may also provide the UP entity 310 with packet handling rules for managing the DL end marker. The packet handling rules for managing DL end marker may include an indication to stop buffering the DL packets of the traffic flow received from the target PSA 330 upon detection of the end marker, as illustrated above. The UP entity 310 may stop buffering in accordance with the packet handling rules and start forwarding the DL packets in the DL direction to the UE. The packet handling rules may be in the form packet detection rules, forwarding action rules, or a combination thereof.

If the tunnel between the UP entity 310 and the target PSA 330 is not established, this tunnel may be established at step 303b. For example, the tunnel may be established by the SMF 210 configuring the tunnel end point at the UP entity 310.

At step 303c, the SMF 210 may configure or activate packet forwarding at the source PSA 320. The forwarding tunnel may be established before configuring or activating the packet forwarding. If the forwarding tunnel is not established at a previous step, it can be established at step 303c. For example, the SMF 210 may configure the source PSA 320 to establish the tunnel end point.

For UL traffic(s), the SMF 210 may configure the source PSA to forward the UL traffic flow to the target PSA 330. The configuration may occur for example when the AF 230 provides an indication that in-order packet delivery is requested, required or preferred for the traffic flow in the AF request (e.g. as illustrated in FIG. 2). The traffic flow may be a UL traffic flow identified by the AF 230. The configuration may include providing the source PSA 320 with new or updated packet forwarding rules. With the received new or updated packet forwarding rules, the source PSA 320 can accordingly forward the UL traffic to the target DNAI, instead of to the source DNAI.

Further, the SMF 210 may configure the source PSA 320 to detect the UL end marker for the UL traffic flow. This may include providing the source PSA with packet detection rules to be applied against UL protocol data units (PDUs) for detecting the UL end marker. The packet detection rules may be generated by the SMF 210 based on or using the information about the UL end marker. The terms "PDU" and "packet" are used interchangeably throughout the application.

Further, the SMF 210 may provide the source PSA 320 with packet handling instructions (or rules) for the follow-up activities upon detection of the UL end marker. Upon detection of the UL end marker, the source PSA 320 may forward the UL end marker to both the target PSA and the source DNAI, in accordance with the instructions provided by the SMF 210. In various embodiments, the instructions may be in the form of packet forwarding rules linked to the packet detection rules described above.

After receiving the packet handling instructions, the source PSA 320 may start forwarding the UE's UL traffic received from the UP entity 310 to the target PSA 330. The UE's UL traffic may be further forwarded by the target PSA 330 to the target DNAI. The UP entity 310 may be directly connected to the target PSA 330 without involving another UPF.

For DL traffic, the SMF 210 may configure the source PSA 320 to forward DL traffic received from the source DNAI to the target PSA 330 through the forwarding tunnel. The configuration may occur for example when the AF 230 provides an indication that in-order packet delivery is requested, required or preferred for the traffic flow in the AF request (e.g. as illustrated in FIG. 2). The traffic flow may be a DL traffic flow identified by the AF 230. The configuration may include providing the source PSA 320 with new or updated packet forwarding rules. With the received new or updated packet forwarding rules, the source PSA 320 can accordingly forward the DL traffic to the target DNAI, instead of the UP entity 310 in the DL.

The SMF 210 may further configure the source PSA 320 to detect and handle the DL end marker. Handling the DL end marker may include forwarding the DL end marker to the target PSA 330, upon detection of the DL end marker, through the forwarding tunnel. To detect and handle DL end marker, the SMF 210 may provide the source PSA 320 with packet detection rules for detecting the DL end marker. The packet detection rules may be generated based on or using the information about the DL end marker. The source PSA 320 may act or behave according to the configuration. For example, the source PSA may act to detect and handle the DL end marker as described above.

The SMF 210 may further configure or instruct the source PSA 320 to send the DL end marker to the UP entity 310. The SMF 210 may configure or instruct the source PSA 320 to send the DL end marker before the source PSA 320 starts forwarding of DL traffic as described above. The source PSA 320 may act or behave (e.g. to send the DL end marker to UP entity 310 as so instructed) according to the configuration or instruction. In various embodiments, the DL end marker or information about the DL end marker (e.g. information on how the DL end marker can be constructed) may be used for the configuration (or corresponding instruction) or included in the configuration (or corresponding instruction) (i.e. when the SMF configures or instructs the source PSA 320 to send the DL end marker).

At step 304, the SMF 210 may optionally send a message to the AF 230 in order to confirm that the UP path toward the target DNAI is ready for use. In some embodiments, step 304 may take place in the form of late notification especially when the step 301 takes place in the form of early notification. As described in 3GPP TS 23.501 V16.0.0, clause 5.6.7, the early notification may be sent before the new UP path is configured, and the late notification may be sent after the new UP path is configured. In such cases (e.g. where step 301 is an early notification and step 304 is a late notification), the step 303 may include further procedures involved in the SMF configuring the new UP path, activating the new UP path, or both (e.g. establishing the UP tunnel(s)).

At step 305, the application relocation is finalized. This may include reordering UL packets of the traffic flow (if the traffic flow is a UL traffic flow).

The second scenario for dynamic negotiation is when the AF (e.g. AF 230) provides information about the flow end marker in the response sent to the SMF (e.g. SMF 210).

When the AF (e.g. AF 230) does not provide information about the flow end marker (e.g. end marker descriptor) in the AF request (e.g. step 201 of FIG. 2), this scenario may correspond to the case where the AF generates or defines or determines the flow end marker on the fly (i.e. dynamically in response to the notification) upon the SMF notification in step 301. On the other hand, when the AF (e.g. AF 230) provides information about the flow end marker information in the AF request (e.g. step 201 of FIG. 2), this scenario may correspond to the case where the AF changes or modifies the flow end marker, which was previously defined or determined by the AF, and sends the updated information about the flow end marker back to the SMF (e.g. the SMF to use), as part of the AF response. Regarding the indication that in-order packet delivery is requested, required or preferred for the traffic flow, the AF (e.g. AF 230) may provide such an indication using or in the AF request (e.g. as illustrated in FIG. 2). If the AF does not provide an indication that in-order packet delivery is requested, required or preferred for the traffic flow using or in the AF request (e.g. as illustrated in FIG. 2), the AF may include this indication in the AF response which is sent to the SMF (e.g. at step 302 in FIG. 3). The traffic flow may be a UL traffic flow or a DL traffic flow. As such, the AF may send the indication in the AF request or AF response, and the AF may send the information on flow end marker in the AF request or AF response, or both.

Further referring to FIG. 3, after performing UP path reselection (including DNAI reselection) for the PDU Session and for the traffic flow, the SMF 210, at step 301, may notify the AF 230 of the UP path change. The UP path change may be a change from the source DNAI to the target DNAI. The SMF 210 may notify the AF 230 in accordance with the relevant policy rules (e.g. information about the AF's subscription to the SMF included in the policy rules) received from the PCF, for example as illustrated in step 203 in FIG. 2.

As described in 3GPP TS 23.501 V16.0.0, clause 5.6.7, the notification may include information indicative of the UE (e.g. the UE that the PDU Session is associated with), information indicative of the source DNAI and information indicative of the target DNAI. The notification may include information that allows the AF 230 to identify the corresponding AF request which subscribes to the notification (e.g. SMF notification, notifications of the DNAI change event). The AF request may include the application ID or information about the traffic filter that identifies the traffic flow (e.g. the traffic flow of the UE identified in the AF request in the step 201 in FIG. 2). The traffic flow is related to the notification.

Upon the SMF 210's notification, the AF 230, at step 302, may respond to the SMF 210. The response may be a positive response indicating that the application layer is ready at the target DNAI in the DN side. The AF 230's response may include an indication that in-order packet delivery is requested, required or preferred for the traffic flow (e.g. the traffic flow identified in the notification in the step 301) related to the DNAI change, e.g. if the AF 230 did not include such indication in the AF request. Here, the AF request may be the AF 230's request for subscription to the SMF notification (e.g. the AF request described in FIG. 2) and the SMF notifications may be notifications of the DNAI change event (UP path management event). Moreover, the AF 230's response may include information about the end marker (e.g. end marker descriptor, direction of traffic flow) for the traffic flow related to the DNAI change. The information about the flow end marker may provide description or instruction on how to construct or detect the flow end marker. The end marker can be for an UL or DL traffic flow.

At step 303, the SMF 210 may configure or activate the new UP path toward the target DNAI (e.g. The SMF 210, at step 303, may configure the new UP path, activate the new UP path, or configure and activate the new UP path.). Step 303 of the second scenario is similar to step 303 of the first scenario. In general, step 303 may include configuring entities such as the UP entity, source PSA and target PSA to act in a manner that retains packet ordering during a relocation event. Actions may include transmitting and receiving end markers, buffering packets, forwarding packets, and transmitting buffered packets. Packets may be buffered and subsequently transmitted at times and in an order that preserves the original packet ordering. Details regarding how packet ordering is preserved are presented elsewhere herein. Further details of step 303 can be found in component steps 303a, 303b and 303c of the first scenario illustrated above.

At step 304, the SMF 210 may send a message to the AF 230 to confirm that the UP path toward the target DNAI is ready for use. Step 304 of the second scenario is an optional step and is similar to step 304 of the first scenario.

At step 305, the application relocation is finalized. This may include reordering UL packets of the traffic flow (if the traffic flow is a UL traffic flow).

The third scenario for dynamic negotiation combines the first and second scenarios illustrated above. The combination of the first scenario and the second scenario may allow the AF (e.g. AF 230) and the SMF (e.g. the SMF 210) to negotiate the end markers during DNAI change in a two-way method. For example, both the SMF notification and the AF response may be used to carry out the information about the end marker.

In the third scenario, it is assumed that the AF (e.g. AF 230) has provided an indication that in-order packet delivery is requested, required or preferred for a traffic flow in the AF request (e.g. the AF request illustrated in step 201 in FIG. 2). The traffic flow may be UL traffic flow or a DL traffic flow.

Further referring to FIG. 3, step 301 in this scenario is similar to step 301 of the first scenario, as described above.

The step 302 in this scenario is similar to step 302 of the second scenario. At step 302, the AF 230 may provide the information about the flow end marker to the SMF 210 as in step 302 of the second scenario illustrated above. The information provided by the AF 230 to the SMF 210 in this step may be updated information about the flow end marker.

The updated information about the flow end marker may describe or instruct how to construct or detect the end marker for the traffic flow. The end marker can be for an UL or DL traffic flow. In some cases, the AF 230 may initially receive the flow end marker from the SMF 210 at step 301 but may change or modify the flow end marker. In such cases, the AF 230 may provide the updated information about the flow end marker to the SMF 210.

At step 303, the SMF 210 may configure or activate the new UP path toward the target DNAI (e.g. The SMF 210, at step 303, may configure the new UP path, activate the new UP path, or configure and activate the new UP path.). Step 303 in this scenario is similar to step 303 of the first scenario. In general, step 303 may include configuring entities such as the UP entity, source PSA and target PSA to act in a manner that retains packet ordering during a relocation event. Actions may include transmitting and receiving end markers, buffering packets, forwarding packets, and transmitting buffered packets. Packets may be buffered and subsequently transmitted at times and in an order that preserves the original packet ordering. Details regarding how packet ordering is preserved are presented elsewhere herein. Further details of step 303 can be found in component steps 303a, 303b and 303c of the first scenario illustrated above.

At step 304, the SMF 210 may send a message to the AF 230 to confirm that the UP path toward the target DNAI is ready for use. Step 304 in this scenario is an optional step and is similar to step 304 of the first scenario.

At step 305, the application relocation is finalized. This may include reordering UL packets of the traffic flow (if the traffic flow is a UL traffic flow).

Figure 4A:
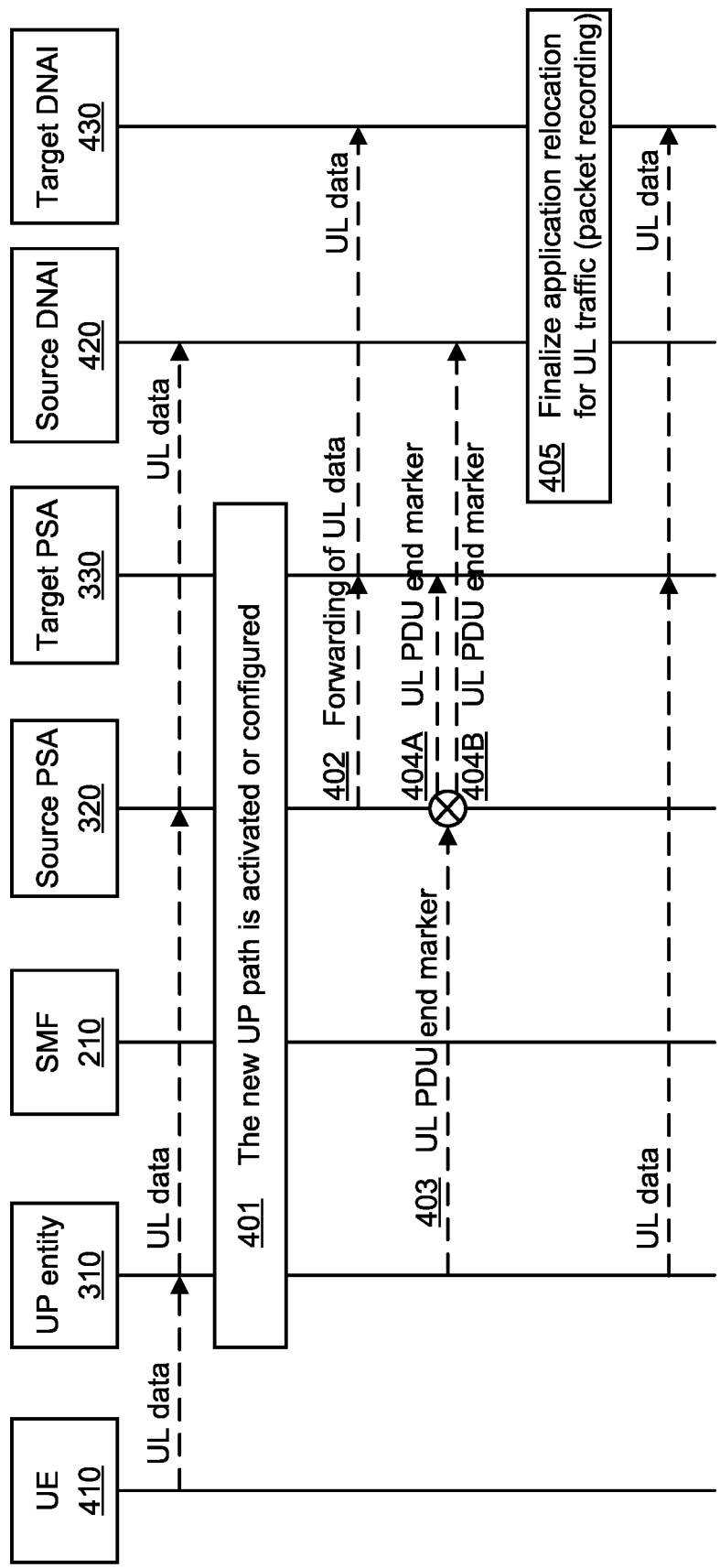
FIG. 4A illustrates, in a message flow diagram, an example procedure that the SMF enforces, ensures or supports in-order delivery of data packets in the UL, in accordance with embodiments of the present invention.
Figure 4B:
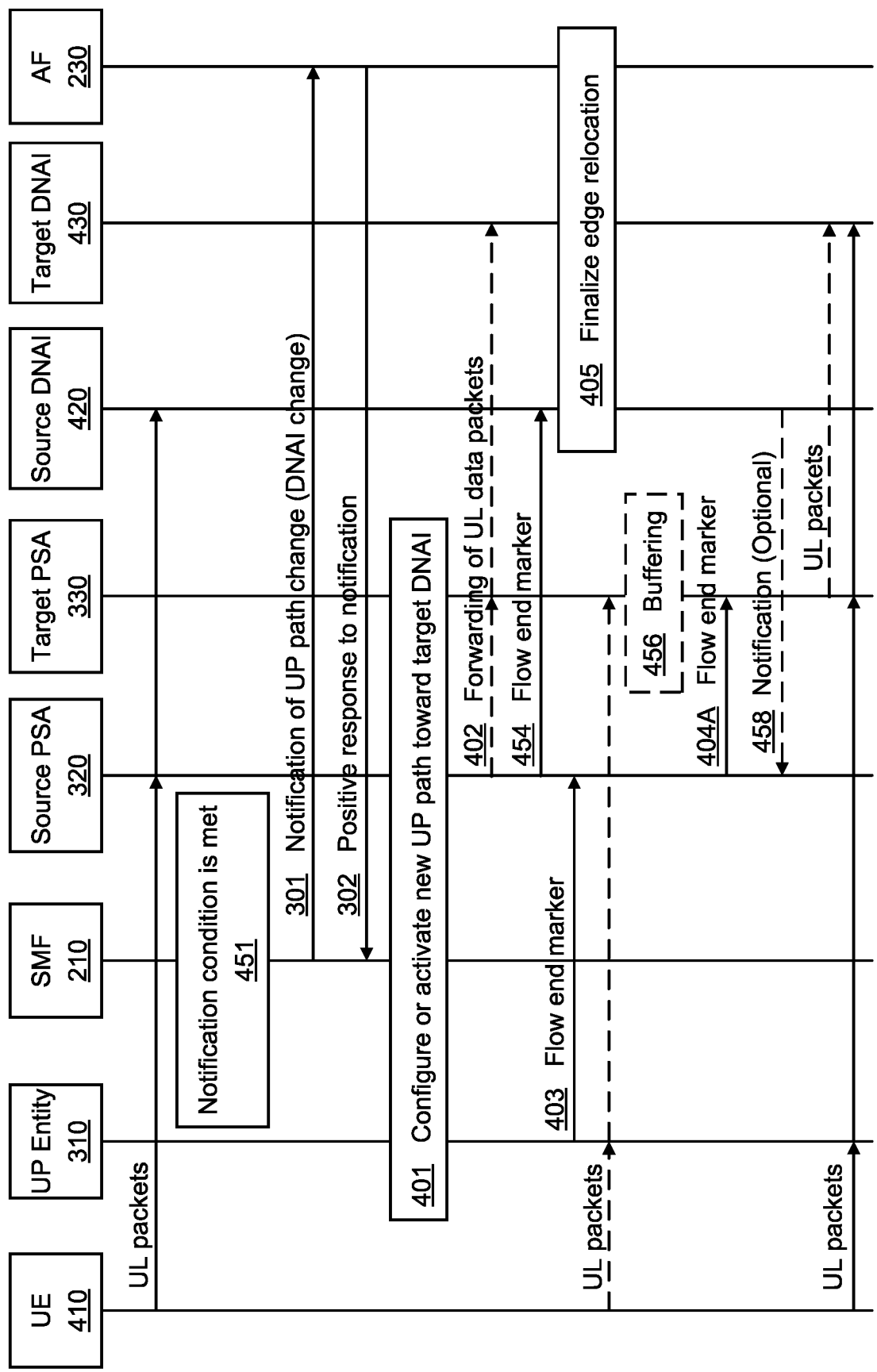
FIG. 4B illustrates, in a message flow diagram, another example procedure to support in-order delivery of data packets in the UL, in accordance with embodiments of the present invention.
Figure 5:
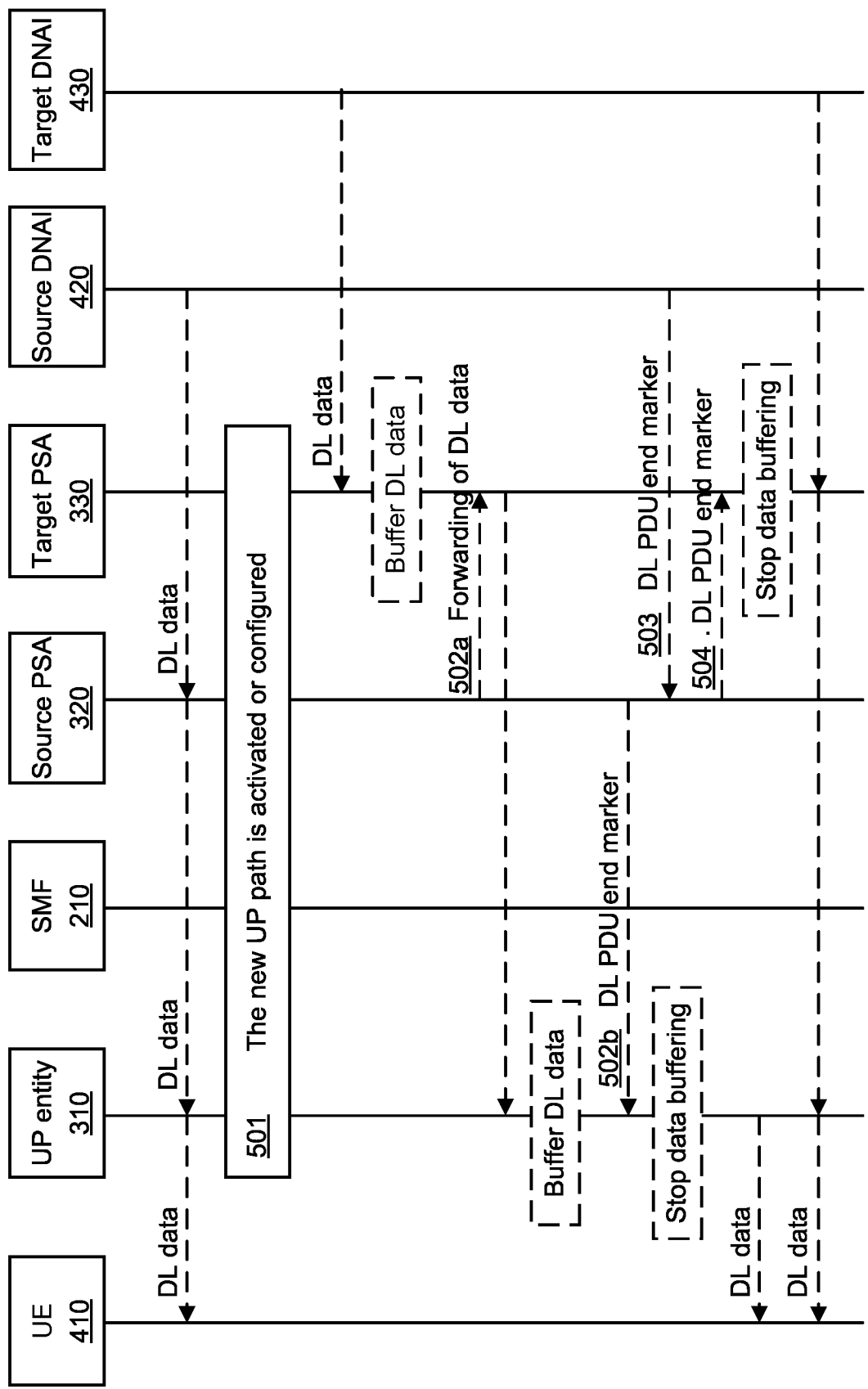
FIG. 5 illustrates, in a message flow diagram, an example procedure that the SMF enforces, ensures or supports in-order delivery of data packets in the DL, in accordance with embodiments of the present invention.

FIGS. 4A, 4B and 5 illustrate how the SMF may enforce, ensure or support in-order delivery in the UL and DL during DNAI change, edge relocation or application relocation, according to some embodiments. For the purpose of illustrating procedures in FIGS. 4A, 4B and 5, the following may be assumed.

Embodiments of the present invention used to perform steps (e.g. steps 401, 501) illustrated in FIGS. 4A, 4B and 5 may be the same as or similar to the embodiments used to perform steps (e.g. step 303) illustrated in FIG. 3. It is also noted that the SMF notification and AF response steps (e.g. steps 301 and 302 of FIG. 3) and the confirmation step (e.g. step 304 of FIG. 3) may take place similarly before or after the steps 401 and 501 in FIGS. 4A, 4B and 5, respectively. They are omitted from FIGS. 4A and 5 for clarity.

In more detail, for FIG. 4B, if the flow end marker information and in-order packet delivery indication are provided using an AF request 201 rather than an AF response 302, then 401 and 501 can happen before 301 and 302, and in this case, the notification 301 is a late notification. Otherwise, 401 and 501 happen after 302 because 401 and 501 involve using information included in 302. In this case the notification 301 can be an early notification (when 401 and 501 are for configuring the UP path) or a late notification (when 401 and 501 are for activating the UP path).

The SMF has established a PDU Session for the UE and the UP path of the PDU Session is connected to the source DNAI via the source PSA. The UE's UL traffic is transmitted along the UP path from the UE to the source DNAI.

The SMF has performed DNAI reselection for the UE and has notified the AF of the DNAI change (e.g. the DNAI change from the source DNAI to the target DNAI). The UE's traffic may be associated with the application and the application's location may be represented by the DNAI. The UE's UL traffic refers to the UE's UL traffic related to or impacted by the DNAI reselection. Upon notifying the AF, the SMF received a positive response from the AF regarding the SMF notification. Then, the SMF determines to activate the new UP path toward the target DNAI. Such operations can be performed using the same or similar approach and mechanisms as is describe above with respect to FIG. 3. This may include, for example, the SMF notifying the AF as in step 301, and the AF responding to the SMF as in step 302.

The SMF and the AF have negotiated the information about the UL flow end marker for the UE's UL traffic and the DL flow end markers for the UE's DL traffic. The negotiation may have been carried out via the procedures described in FIG. 2 or 3. The information about the flow end markers may include the flow end markers (e.g. UL flow end marker, DL flow end marker) and the information about the flow end markers (e.g. packet filters) for identifying the flow end markers. The SMF may have determined to configure or activate the new UP path toward the target DNAI (e.g. after receiving a positive response from the AF).

The source PSA and the target PSA are the same entity if PSA relocation or PSA UPF reselection does not occur. In that case, communication between the source PSA and the target PSA may not occur, and path switch from toward the source PSA to toward the target PSA may not occur either (e.g. the signaling for configuring or activating the path switch may not occur). In some embodiments, the procedure may still happen even if the source PSA and the target PSA are identical; but, communication between the source PSA and the target PSA may be only internally processed, or communication between the source PSA and the target PSA may be performed using (external) signals.

FIG. 4A illustrates an example procedure that the SMF enforces, ensures or supports in-order delivery of data packets in the UL, in accordance with embodiments of the present invention.

At step 401, as noted above, the new UP path (e.g. the new UP path toward the target DNAI 430) may have been activated or configured prior to proceeding the following other steps. It is noted that step 401 in FIG. 4A may be similar to step 303 in FIG. 3. As such, similar to step 303 of FIG. 3, step 401 in FIG. 4A (e.g. activation or configuration of the new UP path) may occur after steps 301 (e.g. SMF notification of UP path change) and 302 (e.g. AF response to the notification) in FIG. 3 are finished but before step 304 (e.g. confirmation of UP path change) in FIG. 3 occurs.

After the new UP path is activated or configured (e.g. after step 303c in FIG. 3 is finished), at step 402, the UL traffic of the UE 410 may be forwarded by the source PSA 320 to the target DNAI 430 through the target PSA 330. The source PSA 320 may first start forwarding the UL traffic of the UE 410 to the target PSA 330. Then, the target PSA 330 may forward (e.g. as instructed or configured by the SMF 210 in the step 303a of FIG. 3) the received UL traffic to the target PSA 330. The UL traffic of the UE 410 may be the UL traffic received from the UP entity 310 (e.g. the (R)AN or the I-UPF). When the UE 410's UL traffic is forwarded to the target DNAI 430, the UP entity 310 (e.g. the (R)AN or the I-UPF) may be directly connected to the target PSA 330 (without involving another UPF).

Upon forwarding the UL traffic of the UE 410, the UP entity 310 (e.g. the (R)AN or the I-UPF), at step 403, may send the UL end marker to the source PSA 320 (e.g. according to the instruction or configuration provided by the SMF 210 in step 303b of FIG. 3). The UL end marker may be sent immediately before UP path is switched or redirected (from the source PSA) to the target PSA. In some cases, the UL end marker may be integrated by the UP entity 310 into a data packet sent from the UE. In some cases, the UL end marker may be transmitted by the UP entity 310 as or in a separate packet.

According to embodiments, the UL end marker may be generated or constructed by the UP entity 310. In some embodiments, the UL end marker may be generated or constructed according to the information about the UL end marker if the information is provided by the SMF 210 to the UP entity 310. In some embodiments, the UL end marker may be provided by the SMF 210 to the UP entity 310.

According to embodiments, the UL end marker may inform the source PSA 320 that the UE 410's UL traffic would be no longer transmitted from the UP entity 310 (e.g. the (R)AN or the I-UPF). The UP entity 310 (e.g. the (R)AN or the I-UPF) may send subsequent UL traffic of the UE 410 to the target PSA 330.

After the UP entity 310 (e.g. the (R)AN or the I-UPF) sends the UL end marker, the source PSA 320, at step 404A, 404B, may receive and detect the UL end marker, and forward the UL end marker to both the target PSA 330 and the source DNAI 420 (e.g. according to the instruction or configuration provided by the SMF 210 in step 303b in FIG. 3). The source PSA 320 may forward the UL end marker as instructed or configured by the SMF 210. Step 404A involves forwarding the UL end marker to the target PSA, while step 404B involves forwarding the UL end marker to the source DNAI. These steps can be carried out concurrently in some embodiments.

According to embodiments, based on the UL end marker received from the source PSA 320, the target PSA 330 may infer that the UL traffic of the UE 410 will no longer be forwarded from the source PSA 320. As such, after this step, the target PSA 330 can start forwarding the UE 410's UL traffic transmitted from the UP entity 310 (e.g. the (R)AN or the I-UPF), e.g. according to the instruction or configuration provided by the SMF 210 in step 303a in FIG. 3. This may ensure that the target PSA 330 sends the PDUs to the target DNAI 430 in order (e.g. in the same order that each PDU is transmitted from the UP entity 310).

According to embodiments, based on the end UL end marker received from the source PSA 320, the the source DNAI 420 may infer that the UL traffic of the UE 410 will no longer be transmitted from the source PSA 320. As such, relocation of application from the source DNAI 420 to the target DNAI 430, including packet reordering, can be finalized, at step 405, for the UE 410's UL traffic. How the application relocation is finalized may also depend on how application relocation is implemented in the DN.

FIG. 4B illustrates, in a message flow diagram, an example procedure for supporting in-order packet delivery during application (edge) relocation, in accordance with other embodiments of the present invention. In the following description and FIG. 4B, the UP entity 310 may be a UL CL. The UP entity may be an existing UPF in the old UP path toward the source DNAI 420 or a UPF which is newly inserted due to edge relocation from the source DNAI 420 to the target DNAI 430. The UP entity 310 may be a common element in the new UP path and the old UP path that is closest to the source PSA 320 and the target PSA 330. The UP entity 310 may be, or be co-located with, the (R)AN node serving the UE 410 or a UPF. For example, the UPF may act as the source PSA 320, UPF acting as the target PSA 330, or a different UPF).

Referring to FIG. 4B, the SMF 210, at step 451, may determine that a condition for an AF notification has been met, prior to proceeding the following other steps. Prior to step 451, the UE 410 may have been transmitting uplink packets toward the source PSA 320 for forwarding thereby toward the source DNAI 420, as illustrated. Determining that the condition has been met at step 451 may be a condition indicative of a DNAI change or application (edge) relocation event, for example. The condition may have been previously determined for example during subscription of the AF to notifications.

After the SMF 210 ensures a condition for an AF notification has been met, at step 301, the SMF 210 may send a notification to the AF 230. The notification is indicative of the UP path change for the UE 410. The UP path change may be, for example, a change from a source DNAI 420 to a target DNAI 430. The SMF 210 may wait for a response from the AF 230 according to the indication(s) provided in a policy rule. The indication(s) provided in the policy rule may include an indication that AF acknowledgement of the notification is expected, an indication that in-order packet delivery is requested, required or preferred, or a combination thereof. The policy rules may be generated or updated in the form of PCC rules. The AF notification can be an early notification or a late notification, as described elsewhere herein. The step 301 illustrated in FIG. 4B is substantially equivalent to the step 301 illustrated in FIG. 3.

In response to the notification sent by the SMF 210 at step 301, the AF 230 may send a positive response to the SMF 210. The positive response from the AF 230 may include information about the flow end marker(s) (e.g. end marker descriptor(s), direction (UL or DL) of the corresponding traffic flow(s)). The positive response may indicate that the in-order packet delivery mechanism as described herein is to be implemented for the present event as indicated in the notification. In some cases, the information about the flow end marker(s) may be raw data provided by the AF 230. In some other case, the information may be processed (or translated, or mapped) information upon analyzing the raw data. The information processing may be performed by network functions such as the NEF (Network Exposure Function) when such a network function is involved. In this case the notification 301 may be sent from the SMF 210 to the AF 230 via the network function performing the information processing. The response 302 may also be sent from the AF 230 to the SMF 210 via the network function performing the information processing. In some embodiments, when the network function (such as NEF) is involved, the network function does not process the information but forwards the information without processing. The step 302 illustrated in FIG. 4B is substantially equivalent to the step 302 illustrated in FIG. 3.

At step 401, the new UP path toward the target DNAI 430 may be configured or activated. The new UP path toward the target DNAI 430 may be configured if the notification in step 301 is an early notification. The new UP path toward the target DNAI 430 may be activated if the notification in step 301 is a late notification. When configuring or activating the new UP path toward the target DNAI 430, the SMF 210, at step 401, may generate the flow end marker based on the flow end marker information received from the AF 230 at step 301. The SMF 210, at step 401, may also provide the flow end marker to the UP entity 310 (e.g. the (R)AN or the I-UPF) and the source PSA 320. The SMF 210, at step 401, may also configure the target PSA 330 such that the target PSA 330 according to the configuration buffers data packets (e.g. UL packets) of the traffic flow received from the UP entity 310 and forwards them only after it receives the flow end marker from the source PSA. Step 401 as illustrated in FIG. 4B may be substantially equivalent to the step 401 illustrated in FIG. 4A and the step 303 illustrated in FIG. 3.

According to embodiments, the UP entity 310 may include one or more of a UP entity configured to receive and forward packets from a user equipment (UE), a source PDU unit session anchor (PSA) configured to act as a PSA prior to the UP path management event, and a target PSA configured to act as the PSA following the UP path management event. As part of the configuration, the UE-facing UP entity 310 can receive information, from the SMF 210, which relates to a flow end marker for a traffic flow. The information can include the flow end marker or information indicative thereof. The information can instruct the UP entity 310 (also referred to as a UPF) to transmit the flow end marker to a source protocol data unit (PDU) session anchor (PSA) for example under a predetermined condition related to the UP path management event. The UP path management event may relate to a change of the user plane path of a protocol data unit (PDU) session. The UP path management event may further relate to a change of a PDU session anchor (PSA) for the traffic flow, a change of a Data Network Access Identifier (DNAI) for the traffic flow, or a combination thereof. The UP entity can follow this instruction. A technical effect is that the UPF is responsive to implement its role in the in-order packet delivery mechanism on an as-needed basis, and is able to use dynamically defined flow end markers.

In some embodiments, the information related to the flow end marker may further instruct the UP entity 310 to transmit uplink (UL) packets for the traffic flow to a designated target PSA. The UP entity 310 may receive said UL packets after the flow end marker is transmitted to the source PSA 320. The UP entity 310 may be further configured to transmit the UL packets to the designated target PSA 320 following transmission of the flow end marker to the source PSA 320. A technical effect is that the in-order packet delivery mechanism is implemented, with packets organized and flow end markers transmitted at appropriate times to enable the mechanism. The UL packets and the flow end marker may belong to a same traffic flow of a protocol data unit (PDU) session. Some or all of the UL packets may be received by the UP entity 310 following transmission of the flow end marker to the source PSA 320. A technical effect is that the traffic flow can continue during a UP path management event while supporting the in-order packet delivery.

In some embodiments, the information related to the flow end marker may further indicate that the UP entity 310 is to support in-order packet delivery during a user plane (UP) path management event related to a change of user plane path of a PDU session for the traffic flow. Prior to a UP path management event associated with the flow end marker, the source PSA 320 may receive packets from the UP entity 310.

At step 402, the source PSA 320 may forward UL packets to the target PSA 330. The target PSA 330 may send these UL packets received from the source PSA 320 to the target DNAI 430 substantially immediately, e.g. substantially without buffering of these packets. Step 402 as illustrated in FIG. 4B may be substantially equivalent to the step 402 illustrated in FIG. 4A and step 405 as illustrated in FIG. 4B may be substantially equivalent to the step 405 illustrated in FIG. 4A and the step 305 illustrated in FIG. 3.

At step 454, the source PSA 320, as configured by the SMF 210, sends the flow end marker to the source DNAI 420.

More generally, the source PSA (or equivalent UPF) may be configured to receive (e.g. from the SMF 210) information related to a flow end marker associated with a traffic flow. According to the information, the source PSA may transmit the flow end marker to a source data network element. A technical effect is that the UPF is responsive to implement its role in the in-order packet delivery mechanism on an as-needed basis, and is able to use dynamically defined flow end markers. In some embodiments, the information related to the flow end maker includes information to be used for detecting the flow end maker in the traffic flow. A technical effect is that, rather than the flow end marker being constructed, a filter usable for detecting the flow end marker can be constructed directly, which may improve efficiency. Another technical effect is that the UPF can detect the flow end marker in user plane traffic so as to take corresponding action(s) to enable the mechanism as instructed by the SMF 210. In some embodiments, the information related to the flow end marker may include information to be used for constructing the flow end maker. A technical effect is that the flow end marker does not need to be explicitly communicated, allowing flexibility. The flow end marker may be constructed according to such information (information to be used for constructing the flow end maker). In some embodiments, the source PSA 320 may be configured to construct the flow end marker according to the information. In some embodiments, the source PSA 320 may receive the flow end marker from another UPF, e.g. the UP entity 310.

In some embodiments, the information related to the flow end marker may include information instructing the source PSA 320 to support in-order packet delivery during a user plane (UP) path management event related to a change user plane path of a PDU session for the traffic flow. Prior to a UP path management event associated with the flow end marker, the source data network element may receive packets from the source PSA 320. The source PSA 320 may be further configured by the SMF 210 to transmit, following transmission of the flow end marker to the source data network element, further UL packets for the traffic flow to a target data network element. The target data network element may reside in a data network (DN) and may be designated to receive packets of the traffic flow of a PDU session following the UP path management event. For example, the target data network element may be configured to receive UL packets of the traffic flow from the target PSA 330 after the UP path management event. A technical effect is that the traffic flow can continue during the UP path management event, while supporting the in-order packet delivery. In some embodiments, the source PSA 320 may be further configured by the SMF 210 to transmit, following transmission of the flow end marker to the source data network element, further UL packets of the traffic flow to a target PSA. The source PSA 320 may be further configured by the SMF 210 to transmit, following said transmitting further UL packets to the target PSA, further UL packets to the target PSA. Said configurations may be performed in response to an instruction from the SMF 210. A technical effect is that the process is controllable by the SMF (e.g. SMF 210), so that it can be implemented on an as-needed basis.

According to embodiments, the information related to the flow end marker includes information instructing the source PSA 320 to transmit the flow end marker to the source data network element and to transmit the further UL packets to a target data network element or to the target PSA 330. In such cases, the target network element or the target PSA 330 may be designated to receive packets of the traffic flow which belongs to a PDU session following the UP path management event.

According to embodiments, the source PSA 320 may be further configured to detect the flow end marker received from another UPF, e.g. the UP entity 310. In such case, the flow end marker may be transmitted as part of the traffic flow which belongs to a PDU session. The source PSA 320 may be also configured to, upon detecting the flow end marker, forward the flow end marker to the target PSA 330. In such cases, the target PSA 330 may be designated to receive packets of the traffic flow following the UP path management event.

According to embodiments, the source PSA 320 may be configured by the SMF 210 to transmit the flow end marker to the source data network element before or after forwarding uplink data packets of the traffic flow to a target UPF. The uplink data packets may be forwarded after receipt of the configuration information from the SMF 210 and according to the configuration information.

In more detail, after the new UP path is activated or configured (e.g. after step 401 of FIG. 4B is finished), at step 454, the source PSA 320 may send the flow end marker to the source DNAI 420. Based on receipt of the flow end marker sent, the source DNAI 420 can determine that no more packets of the traffic flow will come from the source PSA 320. The source DNAI can trigger to finalize or complete edge relocation (or application relocation) in the DN (see e.g. step 405) for the application associated to the traffic flow.

It may be noted that in some embodiments, step 454 may be performed independent of step 403 of FIG. 4B (i.e. step 403 as illustrated and described below). In some embodiments, step 454 and step 403 of FIG. 4B may be performed in parallel. In some other embodiments, step 454 may be triggered by step 403 and thus step 454 may be performed after the step 403. In some embodiments, when step 454 is independent of step 403, in step 401 the SMF 210 provides information about the flow end marker to the source PSA 320 to instruct the source PSA 320 to send the flow end marker to the source DNAI 420. The information may indicate how to construct the flow end marker (e.g. in the form of flow end marker descriptor). Alternatively, the information may include the flow end maker. The source PSA 320, according to the information received from the SMF 210, sends the flow end marker to the source DNAI 420. Before sending the flow end marker, the source PSA 320 may construct the flow end marker. This may occur for example if the information received from the SMF 210 indicates how to construct the flow end marker, instead of the information received from the SMF explicitly including the flow end marker. When step 454 is triggered by step 403, step 454 is substantially equivalent to the step 404B illustrated in FIG. 4A.

At step 403, the UP entity 310 (e.g. the (R)AN or the I-UPF which may be a UL CL UPF or Branching Point (BP) UPF) sends the flow end marker to the source PSA 320. This may occur for example according to the information (instruction or configuration) provided by the SMF 210 in step 401 of FIG. 4B. The information may indicate how to construct the flow end marker or the information may include the flow end maker. The UP entity 310 according to the information received from the SMF 210 sends the flow end marker to the source PSA. The flow end marker may be sent immediately before UP path is switched or redirected (from the source PSA 320) to the target PSA 330, as instructed by the SMF 210 in the information. Before sending the flow end marker, the UP entity 310 may construct the flow end marker, e.g. if the information received from the SMF 210 indicates how to construct the flow end marker instead of includes the flow end marker. In some cases, the flow end marker may be integrated by the UP entity 310 into a data packet sent from the UE 410. In some cases, the flow end marker may be transmitted by the UP entity 310 as or in a separate packet. The step 403 illustrated in FIG. 4B is substantially equivalent to the step 403 illustrated in FIG. 4A.

After performing step 403, the UP entity 310 may send data packets (e.g. UL packets) of the traffic flow to the target PSA 330, as instructed by the SMF 210 in the information received from the SMF 210 in step 401. The data packets may be originated from the UE 410. After receiving the data packets, the target PSA 330, at step 456, may buffer the data packets (e.g. UL packets) received from the UP entity 310. The target PSA 330 may buffer the data packets (e.g. UL packets) until it receives the flow end marker from the source PSA 320 in step 404A.

It may be noted that, in some embodiments, at least some of steps 402, 454 and 403 of FIG. 4B can be concurrently (e.g. simultaneously) performed.

After the UP entity 310 (e.g. the (R)AN or the I-UPF which may be a UL CL UPF or a BP UPF) sends the flow end marker to the source PSA 320, the source PSA 320, at step 404A, may receive and detect the flow end marker. The source PSA 320 may then forward the flow end marker as received from the UP entity 310 to the target PSA 330. In some embodiments, the source PSA 320 may forward the flow end marker to the target PSA 330 as instructed or configured by the SMF 210. This may occur for example according to the information (instruction or configuration) provided by the SMF 210 in step 401 of FIG. 4B. Based on the flow end marker forwarded, the target PSA 330 can determine that no more the packets will be forwarded from the source PSA 320. After receiving the flow end marker, the target PSA 330 may, as configured or instructed (by the SMF 210 in step 401), stop buffering the data packets (e.g. UL packets) received from the UP entity 310. Then, the data packets (e.g. UL packets) may be routed by the target PSA 330 to the target DNAI 430. The step 404A illustrated in FIG. 4B is substantially equivalent to the step 404A illustrated in FIG. 4A.

Accordingly, and in various embodiments, the target PSA (or equivalent UPF) may be configured to receive information from a session management function (SMF), the information indicative of a flow end marker for a traffic flow associated with a PDU Session. The target PSA may then detect receipt of the flow end marker from a source UP (e.g. the source PSA). Upon detection of the flow end marker, the target PSA may forward, toward a target data network element, packets of the traffic flow which are received and buffered by the target PSA. After forwarding all of the packets of the traffic flow which are received and buffered, the target PSA may forward further packets of the traffic flow toward the target data network element. A technical effect is that the target PSA is responsive to implement its role in the in-order packet delivery mechanism on an as-needed basis, and is able to use dynamically defined flow end markers. In-order packet delivery is supported while the traffic flow continues.

According to embodiments, the target PSA 330 may be further configured (by the SMF 210 in step 401), prior to detecting receipt of the flow end marker, to receive and forward said packets received from the source UPF (e.g. the source PSA 320). The further packets of the traffic flow may be received from another user plane function (UPF), e.g. the UP entity 310. The further packets of the traffic flow may be received and buffered by the target PSA 330. In some embodiments, the packets of the traffic flow may be received from the source PSA 320, another UPF (e.g. the UP entity 310), or a combination thereof.

According to embodiments, the target PSA 330 may be configured to buffer said further packets of the traffic flow, to receive and forward said packets of the traffic flow, or both, based on a configuration signal received from the SMF 210 (configuration by the SMF 210 in step 401). A technical effect is that the UPF procedure supporting in-order packet delivery is controllable by the SMF. In some embodiments, some or all of said further packets are received at the target PSA 330 prior to or after forwarding all of the said packets of the traffic flow. In some other embodiments, some or all of said packets are received at the target PSA 330 prior to and after receiving and buffering all of the said further packets of the traffic flow. The said further packets of the traffic flow are received and buffered by the target PSA 330. A technical effect is that the in-order packet delivery procedure is supported for a variety of timings of flow end marker receipt.

In some embodiments, after the source PSA 320 sends the flow end marker to the source DNAI 420 at step 454, the source PSA waits for a notification from the source DNAI. The source PSA does not send the flow end marker at step 404A to the target PSA 330 during such waiting. The source PSA 320 sends the flow end marker, at step 404A, to the target PSA 330 only after receiving the notification from the source DNAI 420. After step 405, the notification is sent from the source DNAI 420 to the source PSA 320, at step 458, as a response to the flow end marker sent at step 454. The notification may be in the form of the flow end marker in response to the flow end marker sent from the source PSA 320 to the source DNAI 420 at step 454. In other words, the return of the flow end marker from the source DNAI 420 to the source PSA 320 may be the notification at step 458. The notification may alternatively be in the form of a DL flow end marker described elsewhere in the current application, e.g. step 503 illustrated in FIG. 5. The notification indicates that the application relocation has completed or finalized. The source PSA 320 acts as described above according to the information (e.g. configuration or instruction) provided from the SMF 210 in step 401. In other words, the SMF 210 configures the source PSA 320 how to behave and the source PSA 320 behaves as configured by the SMF 210. This embodiment can apply to both the case that step 454 is independent of step 403 and the case that step 454 is triggered by step 403, described above.

FIG. 5 illustrates an example procedure that the SMF enforces, ensures or supports in-order delivery of data packets in the DL, in accordance with embodiments of the present invention.

At step 501, as noted above, the new UP path (e.g. the new UP path toward the target DNAI 430) may have been activated or configured prior to the following steps. It is noted that step 501 in FIG. 5 may be similar to step 303 in FIG. 3. As such, similar to step 303 of FIG. 3, step 501 in FIG. 5 (e.g. activation or configuration of the new UP path) may occur after steps 301 (e.g. SMF notification of UP path change) and 302 (e.g. AF response to the notification) in FIG. 3 are finished but before step 304 (e.g. confirmation of UP path change) in FIG. 3 occurs.

After the new UP path is activated or configured (e.g. after step 303c in FIG. 3), the DL data packets may be transmitted from the target DNAI 430 to the target PSA 330. The target PSA 330 may buffer the received DL data packets if necessary.

At step 502a, the source PSA 320 may forward the DL data packets to the UP entity 310 (e.g. (R)AN node or the I-UPF) through the target PSA 330. In other words, the source PSA 320 may forward the DL data packets to the target PSA 330 (e.g. as instructed or configured by the SMF 210 in step 303c of FIG. 3) and the target PSA 330 may forward these DL data packets to the UP entity 310 (e.g. as instructed or configured by the SMF 210 in step 303a of FIG. 3). If necessary, some of the transmitted DL data packets may be buffered by at the UP entity 310 (e.g. according to the instruction or configuration provided by the SMF 210 in the step 303b of FIG. 3). The I-UPF may be a UL CL UPF or a BP UPF.

At step 502b, the source PSA 320 may send the DL end marker to the UP entity 310 (e.g. as instructed or configured by the SMF 210 in step 303c in FIG. 3). In some cases, the DL end marker may be received from the SMF 210 as part of the configuration or instruction. In some other cases, the DL end marker may be constructed or generated by the source PSA 320 according to the configuration or instruction. The DL end marker may inform the UP entity 310 (e.g. (R)AN node or the I-UPF) that subsequent DL packets would be no longer transmitted from the source PSA 320.

Upon receiving the DL end marker from the source PSA 320, the UP entity 310 (e.g. (R)AN node or the I-UPF) may start forwarding the UE 410 the DL data packets transmitted from the target PSA 330 (e.g. according to the instruction or configuration provided by the SMF 210 in step 303b of FIG. 3. If there are any data buffered at the UP entity 310, the UP entity 310 may forward those buffered data packets prior to forwarding the data packets transmitted from the target PSA 330. This may ensure that, in the DL, the data packets from the source DNAI 420 are transported to the UE 410 before the data packets from target DNAI 430 are transported.

At step 503, the source DNAI 420 may send the DL end marker to the source PSA 320. This DL end marker may indicate that no more DL data packets would be transmitted from the source DNAI 420. The source DNAI 420 may perform this step according to the AF 230's configuration or instruction, which may happen (e.g. in step 305 in FIG. 3) after the AF 230 receives the confirmation of UP path change from the SMF 210 (e.g. step 304 in FIG. 3). The AF 230's configuring of the source DNAI 420 to send the DL end marker is not shown in FIG. 5.

At step 504, the source PSA 320 may forward the DL end marker to the target PSA 330 in accordance with the configuration or instruction provided by the SMF 210 (e.g. configuration performed in step 303c of FIG. 3).

After receiving the DL end marker forwarded from the source PSA 320, the target PSA 330 may start forwarding the DL packets transmitted from the target DNAI 430 (e.g. as instructed or configured by the SMF 210 in step 303a in FIG. 3). The target PSA 330 may forward the DL packets to the UE 410 via the UP entity 310 (e.g. (R)AN node or the I-UPF). If there are any data buffered at the target PSA 330, the target PSA 330 may forward those buffered data packets first prior to forwarding the data packets transmitted from the target DNAI 430. This may ensure that, in the DL, the data packets from the source DNAI 420 are transported to the UE 410 before the data packets from target DNAI 430 are transported.

Figure 6:
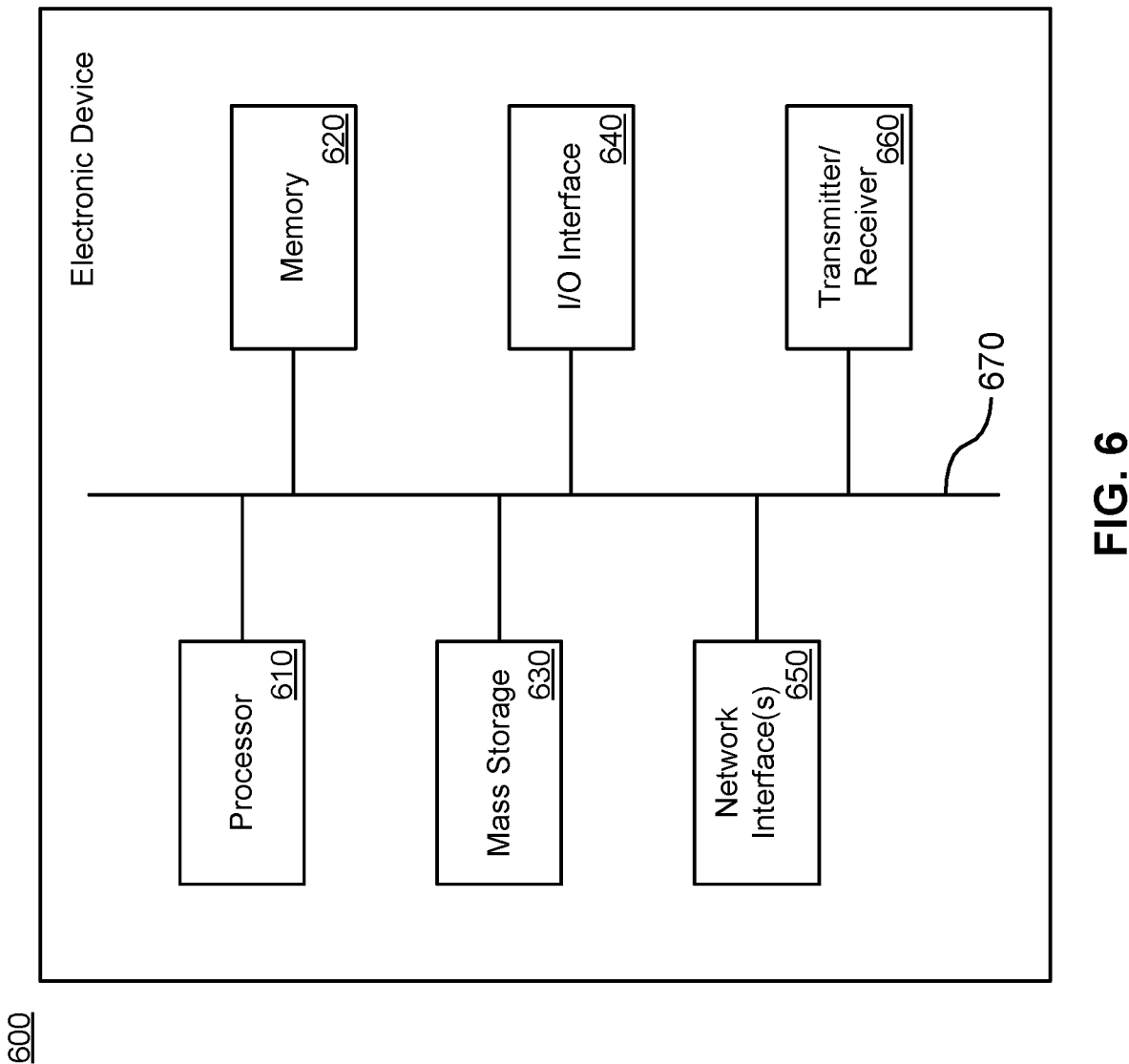
FIG. 6 illustrates, in a schematic diagram, an electronic device in accordance with embodiments of the present invention.

FIG. 6 is a schematic diagram of an electronic device 600 that may perform any or all of operations of the above methods and features explicitly or implicitly described herein, according to different embodiments of the present invention. For example, a UE may be configured as electronic device 600. Further, a data network element hosting any of the network functions described herein (e.g., AF, PCF, SMF) may be configured as the electronic device 600.

As shown, the device includes a processor 610, memory 620, non-transitory mass storage 630, I/O interface 640, network interface 650, and a transceiver 660, all of which are communicatively coupled via bi-directional bus 670. According to certain embodiments, any or all of the depicted elements may be utilized, or only a subset of the elements. Further, the device 600 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 620 may include any type of non-transitory memory such as static random access memory (SRAM), dynamic random access memory (DRAM), synchronous DRAM (SDRAM), read-only memory (ROM), any combination of such, or the like. The mass storage element 630 may include any type of non-transitory storage device, such as a solid state drive, hard disk drive, a magnetic disk drive, an optical disk drive, USB drive, or any computer program product configured to store data and machine executable program code. According to certain embodiments, the memory 620 or mass storage 630 may have recorded thereon statements and instructions executable by the processor 610 for performing any of the aforementioned method operations described above.

Figure 7:
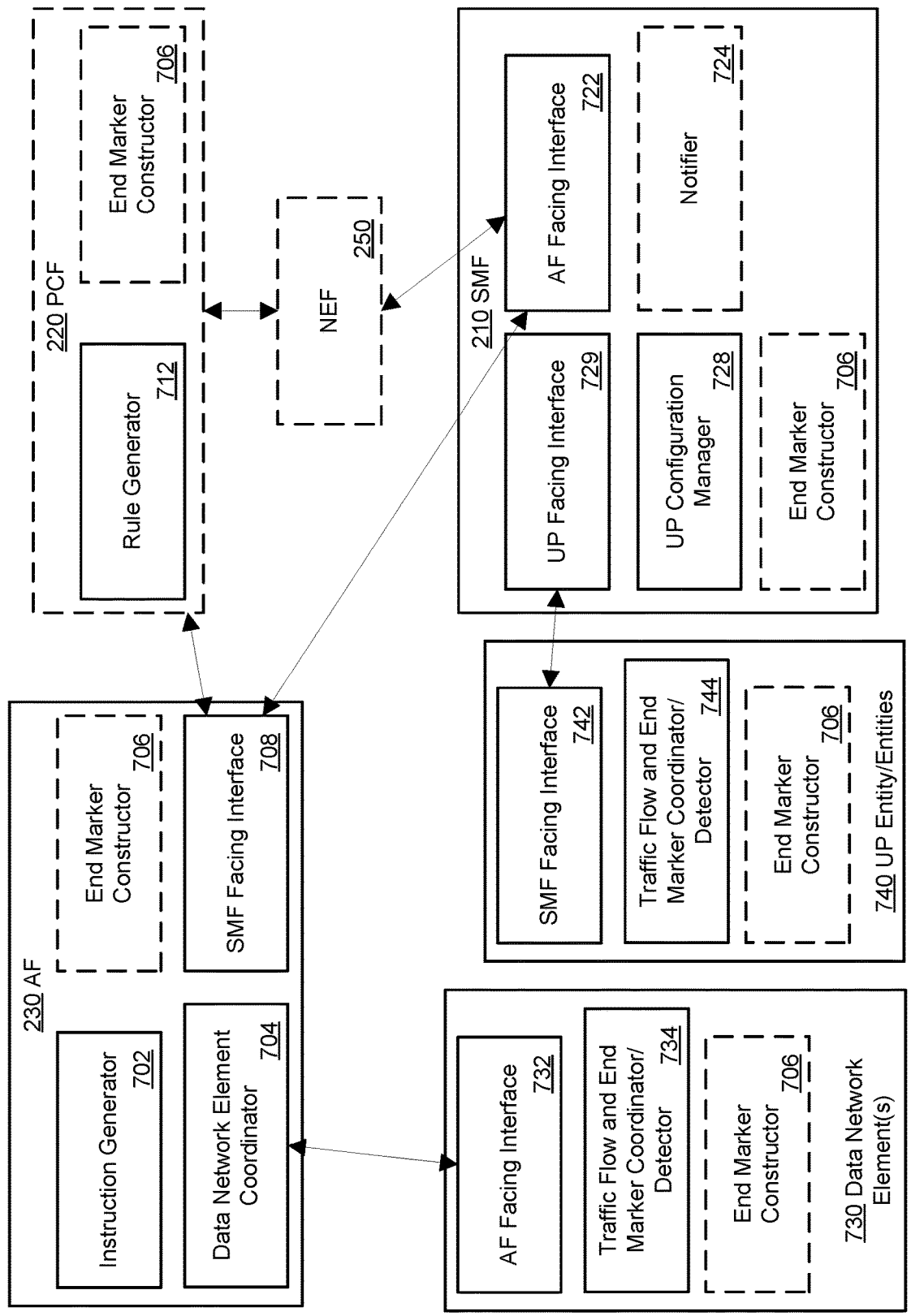
FIG. 7 illustrates various electronic apparatuses and a corresponding system provided in accordance with embodiments of the present invention.

FIG. 7 illustrates various electronic apparatuses and a corresponding system provided in accordance with embodiments of the present invention. The system includes an SMF 210, an SMF 230, one or more data network elements 730, and one or more UP entities 740. The data network elements 730 can include a source data network element, a target data network element, or a combination thereof. These can respectively correspond to the source DNAI 420 and target DNAI 430 as described elsewhere for example with respect to FIGS. 4A to 5. The UP entities 740 can include a UE-facing UP entity 310, source PSA 320, a target PSA 330, or a combination thereof, as described elsewhere for example with respect to FIGS. 3 to 5. The system may include a PCF 220, an NEF 250, or a combination thereof.

At least one of the SMF 210, the PCF 220, the AF 230, the source PSA 320, the data network elements 730 and the UP entities 740 includes an end marker constructor 706. The end marker constructor(s) operate to construct an end marker for transmitting along or as part of a traffic flow, based at least in part on received information from other entities. Different ones of the illustrated end marker constructors 706 may operate differently. Not all illustrated apparatuses necessarily include an end marker constructor. Rather, the end marker constructor may only be present or functional when an apparatus is required to construct its own end marker, rather than receiving the end marker from another apparatus.

The SMF 210 includes an AF facing interface 722 configured to communicate directly or indirectly with the AF 230. This communication can include receiving subscription requests from the AF, receiving rules from the PCF, transmitting notifications of UP path changes to the AF, receiving responses from the AF, transmitting or receiving information based upon which flow end markers are constructed, etc. The SMF may include a notifier 724, which generates and manages notifications of UP path change events for transmission toward the AF. The notifier may be configured based on subscription information received directly or indirectly from or on behalf of the AF. The SMF further includes a UP configuration manager 728 and a UP facing interface 729. The UP facing interface 729 communicates directly or indirectly with various UP entities 740, to pass messages between the UPFs and the UP configuration manager 728. The UP configuration manager 728 operates to configure the UP entities to support in-order packet delivery during a UP path management event. This can include providing the UP entities with flow end markers or information based upon which a flow end marker or a filter for detecting a flow end marker can be constructed. This can further include providing the UP entities with packet detection rules, forwarding action rules, or both.

The UP entities 740 include an SMF facing interface 742 which communicates directly or indirectly with the SMF 210. The UP entities include a traffic flow and end marker coordinator, detector, or coordinator and detector 744. This device coordinates the various actions to support in-order packet delivery. These actions may differ depending on the role of the UP entity (for example, depending on whether the UP entity is a UE-facing UP entity, a source PSA, or a target PSA). Generally, the actions can include monitoring (detecting) for a flow end marker, transmitting a flow end marker in response to a trigger, receiving and buffering packets, receiving and forwarding packets, changing between buffering and forwarding of received packets based on a trigger, and changing destinations to which packets are forwarded based on a trigger. The various actions are described elsewhere herein, for example with respect to FIGS. 4A to 5.

The PCF 220, when present, may include a rule generator 712. The rule generator which is configured to generate rules, such as PCC rules. The rules are provided to the SMF. The rules may indicate that the SMF is to support in-order packet delivery for a traffic flow associated with a PDU Session. The rules may include an indication of or information about the flow end marker. The rules may include AF subscription information. The subscription information may be received directly or indirectly from the AF 230. The rules may be generated based on one or more messages or instructions received from the AF.

The AF 230 includes an instruction generator 702 and an SMF facing interface 708. The SMF facing interface communicates directly or indirectly (e.g. via a PCF, a NEF, or a combination of thereof) with the SMF, for example to subscribe to notifications from the SMF, to respond to such notifications, to provide an end marker or information indicative of an end marker toward the SMF, or a combination thereof. These and other actions can be managed by the instruction generator 702. The instruction generator may generate instructions causing the SMF to implement in-order packet delivery for a traffic flow (during a UP path management event), and related information such as end marker information. The AF 230 may include a data network element coordinator 704. The data network element coordinator 704 communicates with data network element(s) 730 to configure these data network elements to implement in-order packet delivery for a traffic flow during the UP path management event.

The data network element(s) 730 can include a source data network element, a target data network element, or a combination thereof. The source data network element can be identified with a source DNAI 420, and the target data network element can be identified with a target DNAI 430, as described elsewhere herein. The data network element(s) include an AF facing interface which communicates directly or indirectly with the AF 230. The data network element(s) include a traffic flow and end marker coordinator, detector, or coordinator and detector 734. This device coordinates the various actions to support in-order packet delivery. These actions may differ depending on the role of the data network element (for example, depending on whether the data network element is a source data network element associated with a source DNAI or a target data network element associated with a target DNAI). Generally, the actions can include monitoring (detecting) for a flow end marker, transmitting a flow end marker in response to a trigger, receiving and buffering packets, receiving and forwarding packets, changing between buffering and forwarding of received packets based on a trigger, and changing destinations to which packets are forwarded based on a trigger. The various actions are described elsewhere herein, for example with respect to FIGS. 4A to 5.

In accordance with embodiments of the present invention, there is provided a method for supporting in-order packet delivery in a communication network. The method includes, by an application function (AF) of the communication network, generating an indication that in-order packet delivery is requested, required or preferred for a particular traffic flow of a UE during a user plane path management event. The indication may be transmitted in an AF request message. The method further includes, by the AF, transmitting the indication toward a policy control function (PCF) of the communication network or toward a session management function (SMF) associated with the particular traffic flow.

In some embodiments, the user plane path management event comprises a data network address identifier (DNAI) change or an application relocation event. In some embodiments, the indication comprises or is associated with one or more of: information identifying the traffic flow; information identifying an application supported by the traffic flow; an identifier of the UE that the traffic flow belongs to; a direction of the traffic flow; and information indicative of a flow end marker to be used in implementing, enforcing or supporting in-order packet delivery for the traffic flow during the user plane path management event. In some embodiments, the information identifying the traffic flow is an identifier of the traffic flow or a packet filter for use in identifying the traffic flow. In some embodiments, the information indicative of the flow end marker is a packet filter, an end marker descriptor, or an identifier indicative of a previously defined packet filter or end marker descriptor.

In some embodiments, the indication is transmitted in a request message. In such embodiments, the method for supporting in-order packet delivery in a communication network further includes, following transmitting by the AF the indication to the PCF, receiving a notification from the SMF, the notification indicative of the user plane path management event potentially affecting ordering of packets delivered for the traffic flow. The notification further includes information indicative of a new or updated flow end marker to be used in implementing, enforcing or supporting an in-order packet delivery mechanism for the traffic flow during the user plane path management event. The method further includes, following transmitting by the AF the indication to the PCF, configuring or reconfiguring one or more components of the in-order packet delivery mechanism to use the information indicative of the new or updated flow end marker. The method further includes, following transmitting by the AF the indication to the PCF, transmitting a response to the SMF. The response is indicative that an application portion of the communication network is ready for the user plane path management event.

In some embodiments, the method for supporting in-order packet delivery in a communication network further includes receiving a notification from the SMF. The notification is indicative of occurrence or imminence of the user plane path management event potentially affecting ordering of packets delivered for the traffic flow. The method further includes transmitting, to the SMF, a response to the notification. The response includes information indicative of a flow end marker to be used in implementing, enforcing or supporting an in-order packet delivery mechanism for the traffic flow during the user plane path management event. The indication may be generated and transmitted to the SMF in the response to the notification, or may be generated and transmitted in a request message to the SMF. In such cases, the request message is transmitted prior to the response to the notification. In some embodiments, the method further comprises, prior to receiving the notification from the SMF, transmitting a subscription message requesting receipt of the notification from the SMF. The subscription message comprises an indication of the particular traffic flow of the UE, and the notification is generated based on content of the subscription message. In some embodiments, the method further comprises configuring or reconfiguring one or more components of the in-order packet delivery mechanism to use the information indicative of the flow end marker. In such cases, the response is further indicative that an application portion of the communication network is ready for the user plane path management event.

In some embodiments, the indication is transmitted in a request message. In such embodiments, the method further includes, following transmitting the indication to the PCF, receiving a notification from the SMF. The notification is indicative of the user plane path management event potentially affecting ordering of packets delivered for the traffic flow. The notification further includes information indicative of a new or updated flow end marker to be used in implementing, enforcing or supporting an in-order packet delivery mechanism for the traffic flow during the user plane path management event. The method further includes, following transmitting the indication to the PCF, transmitting a response to the notification from the SMF. The response is indicative that the new or updated flow end marker is accepted, or comprises information indicative of a further revised flow end marker for implementation by the SMF. The method further includes, following transmitting the indication to the PCF, configuring or reconfiguring one or more components of the in-order packet delivery mechanism to use the new or updated flow end marker when the new or updated flow end marker is accepted. The method further includes, following transmitting the indication to the PCF, configuring or reconfiguring the one or more components of the in-order packet delivery mechanism to use the further revised the flow end marker when the information indicative of the further revised flow end marker is transmitted in the response. In some embodiments, the method further includes, following transmitting the indication to the PCF, receiving a confirmation message from the SMF indicative that a new user plane path due to the user plane path management event is ready for use.

In accordance with embodiments of the present invention, there is provided a method for supporting in-order packet delivery in a communication network. The method includes, by a policy control function (PCF) of the communication network, receiving, from an application function (AF), a request message comprising an indication that in-order packet delivery is requested, required or preferred for a particular traffic flow of a UE during a user plane path management event. The method further includes, by the PCF, generating or updating one or more policy rules for implementing or enforcing or supporting in-order packet delivery for the particular traffic flow of the UE during the user plane path management event. The method further includes, by the PCF, transmitting a message indicating the one or more policy rules toward a session management function (SMF) serving a communication session of the particular traffic flow of the UE.

In some embodiments, the method for supporting in-order packet delivery in a communication network further includes transmitting an acknowledgement to the AF in response to the request message. In some embodiments, the one or more policy rules are generated based on the request message from the AF, the one or more policy rules including contents of the indication, information associated with the indication, or both, and the one or more policy rules indicate that in-order packet delivery is requested, required or preferred. In some embodiments, the one or more policy rules indicate one or more of: information identifying the traffic flow; information identifying an application supported by the traffic flow; an identifier of the UE that the traffic flow belongs to; a direction of the traffic flow; and information indicative of a flow end marker to be used in implementing, enforcing or supporting in-order packet delivery for the traffic flow during the user plane path management event. In some embodiments, the information identifying the traffic flow is an identifier of the traffic flow or a packet filter for use in identifying the traffic flow. In some embodiments, the information indicative of the flow end marker is a packet filter, an end marker descriptor, or an identifier indicative of a previously defined packet filter or end marker descriptor. The user plane path management event may comprise a data network address identifier (DNAI) change or an application relocation event.

In accordance with embodiments of the present invention, there is provided a method for supporting in-order packet delivery in a communication network. The method includes, by a session management function (SMF) of the communication network, receiving, from an application function (AF) or a policy control function (PCF), an indication that in-order packet delivery is requested, required or preferred for a particular traffic flow of a UE during a user plane path management event. The method further includes, by the SMF, configuring one or more user plane entities to handle network traffic corresponding to the traffic flow in a specified manner for implementing or enforcing or supporting in-order packet delivery thereof. In some embodiments, the indication is received from the PCF, and the indication is included in one or more policy rules.

In some embodiments, the indication is included in a request message. In such cases, the method for supporting in-order packet delivery in a communication network further includes, at a time after receiving the indication from the PCF, generating and transmitting a notification to the AF. The notification is indicative of the user plane path management event potentially affecting ordering of packets delivered for the traffic flow. The notification further includes information indicative of a new or updated flow end marker to be used in implementing, enforcing or supporting an in-order packet delivery mechanism for the traffic flow during the user plane path management event. The method further includes, at a time after receiving the indication from the PCF, receiving a response from the AF, the response indicative that an application portion of the communication network is ready for the user plane path management event. The method further includes, at a time after receiving the indication from the PCF, implementing, enforcing or supporting the in-order packet delivery mechanism upon receipt of the response.

In some embodiments, the method for supporting in-order packet delivery in a communication network further includes generating and transmitting a notification to the AF. The notification is indicative of occurrence or imminence of the user plane path management event potentially affecting ordering of packets delivered for the traffic flow. The method further includes receiving, from the AF, a response to the notification. The response includes information indicative of a flow end marker to be used in implementing, enforcing or supporting an in-order packet delivery mechanism for the traffic flow during the user plane path management event. In such embodiments, the indication is received from the AF in the response to the notification, or is received in a request message transmitted prior to the response to the notification. In some embodiments, the method further includes, prior to generating and transmitting the notification, receiving a subscription message from the AF requesting receipt of the notification. The subscription message comprises an indication of the particular traffic flow of the UE. Generating and transmitting the notification may occur due to the subscription message. In some embodiments, the response is further indicative that an application portion of the communication network is ready for the user plane path management event.

In some embodiments, the method for supporting in-order packet delivery in a communication network further includes, following receiving the indication from the PCF, generating and transmitting a notification to the AF. The notification is indicative of the user plane path management event potentially affecting ordering of packets delivered for the traffic flow. The notification further includes information indicative of a new or updated a flow end marker to be used in implementing, enforcing or supporting an in-order packet delivery mechanism for the traffic flow during the user plane path management event. The method further includes, following receiving the indication from the PCF, receiving a response from the AF. The response is indicative that the new or updated the flow end marker is accepted, or comprises information indicative of a further revised flow end marker for implementation by the SMF. In such embodiments, the one or more user plane entities are configured to use the new or updated flow end marker when the new or updated flow end marker is accepted, and to use the further revised flow end marker when the information indicative of the further revised flow end marker is transmitted in the response. In some embodiments, the method further includes transmitting a confirmation message to the AF indicative that a new user plane path due to the user plane path management event is ready for use.

In some embodiments, the method for supporting in-order packet delivery in a communication network further includes defining a traffic filter, a flow end marker, or both, based on at least in part on content of the indication, the traffic filter and the flow end marker used in implementing, enforcing or supporting the in-order packet delivery mechanism. In some embodiments, the indication includes information indicative of a flow end marker. The one or more user plane entities may be configured based on the information indicative of the flow end marker.

In some embodiments, the method for supporting in-order packet delivery in a communication network further includes, by the SMF, managing the one or more user plane entities to handle the user plane path management event. In some embodiments, configuring the one or more user plane entities comprises causing the one or more user plane entities to perform operations in a manner specified by the SMF. The operations comprise one or more of: routing end traffic corresponding to the traffic flow; transmitting end markers; buffering traffic corresponding to the traffic flow; and transmitting previously buffered data corresponding to the traffic flow. In some embodiments, the one or more user plane entities comprise one or more of: a user plane entity residing in the communication network and communicatively coupled to the UE; a source PDU session anchor handling the traffic flow prior to the user plane path management event; a target PDU session anchor handling the traffic flow following the user plane path management event; and a PDU session anchor handling the traffic flow both before and after the user plane path management event.

In accordance with embodiments of the present invention, there is provided an apparatus in a communication network implementing an application function (AF). The apparatus comprises a processor, a memory and a network interface and configured to implement the method of the AF as discussed above or elsewhere herein.

In accordance with embodiments of the present invention, there is provided an apparatus in a communication network implementing a policy control function (PCF). The apparatus comprises a processor, a memory and a network interface and configured to implement the method of the PCF as discussed above or elsewhere herein.

In accordance with embodiments of the present invention, there is provided an apparatus in a communication network implementing a session management function (SMF). The apparatus comprises a processor, a memory and a network interface and configured to implement the method of the SMF as discussed above or elsewhere herein.

In accordance with embodiments of the present invention, there is provided a system in a communication network including two or more of an apparatus implementing an application function (AF), an apparatus implementing a policy control function (PCF) and a session management function (SMF). Each of the two or more apparatuses comprises a processor, a memory and a network interface, and is configured to implement the method of the AF, PCF and SMF, respectively, as discussed above or elsewhere herein.

In accordance with embodiments of the present invention, there is provided a system comprising two or more of: an AF, a PCF and an SMF, each configured as described above or elsewhere herein. The AF, PCF and SMF are communicatively coupled together and collectively configured to implement operations supporting in-order packet delivery in a communication network.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. An apparatus in a communication network implementing a session management function (SMF), the apparatus comprising a processor, a memory and a network interface and configured to:
   a) receive an indication that in-order packet delivery is requested for a traffic flow;
   b) generate or modify information related to a flow end marker to be used in supporting said in-order packet delivery;
   wherein the indication that in-order packet delivery is requested is received directly or indirectly from an application function (AF);
   c) transmit, to the AF, the generated or modified information related to the flow end marker using an SMF notification; and
   d) based on the indication, configure one or more user plane (UP) entities to support in-order packet delivery during a UP path management event related to the traffic flow, wherein the UP path management event comprises changing of a data network address identifier (DNAI) associated with an application, the communication network coupling the application with a mobile UE, wherein said configuring comprises providing at least one of the UP entities with said information related to the flow end marker or providing at least one of the UP entities with further information derived from said information related to the flow end marker.

2. The apparatus of claim 1, further configured to:
   receive subscription information indicating the application function (AF)'s subscription to a notification of the UP path management event,
   in response to the subscription information, transmit the notification to the AF, and
   receive, from the AF, a response to the notification, the response including said indication that in-order packet delivery is requested, said information related to the flow end marker, or both.

3. The apparatus of claim 2, wherein the indication that in-order packet delivery is requested, the information related to the flow end marker, or both are received from the application function (AF) without involving a policy control function (PCF).

4. The apparatus of claim 1, wherein the indication that in-order packet delivery is requested, the information related to the flow end marker, or both are received from the AF indirectly via a policy control function (PCF).

5. The apparatus of claim 4, further configured to receive one or more rules from the PCF, wherein said rules include one or more of: the indication that in-order packet delivery is requested; and the information related to the flow end marker.

6. The apparatus of claim 5, wherein the rules are generated by the PCF according to information provided to the PCF by the AF, the information including one or more of: the indication that in-order packet delivery is requested; and the information related to the flow end marker.

7. The apparatus of claim 1, wherein the indication that in-order packet delivery is requested; and the information related to the flow end marker are integrated together or included in a same message.

8. The apparatus of claim 1, further configured to generate the further information, wherein said information related to the flow end marker, the further information, or both, include the flow end marker, information based on which the flow end marker is generated, or both.

9. The apparatus of claim 1, wherein the UP path management event further relates to a change of the UP path of a protocol data unit (PDU) session, a change of a PDU session anchor (PSA) for the traffic flow, or a combination thereof.

10. The apparatus of claim 1, wherein the UP entities include one or more of: a UP entity configured to receive and forward packets from a user equipment (UE); a source PDU unit session anchor (PSA) configured to act as a PSA prior to the UP path management event; and a target PSA configured to act as the PSA following the UP path management event.

11. The apparatus of claim 1, wherein configuring the one or more UPF entities to support in-order packet delivery comprises one or more of: configuring a target PDU session anchor (PSA) to buffer packets of the traffic flow, the traffic flow being associated with a PDU session; configuring the target PSA to receive and forward additional packets of the traffic flow associated with the PDU session; configuring a UPF to transmit the flow end marker to a source PSA; and configuring the source PSA to detect the flow end marker and forward the flow end marker to a source network element, to the target PSA or to both.

12. The apparatus of claim 11, wherein the source network element and a target network element reside in the data network (DN) and are configured to receive UL packets of the traffic flow from the source PSA prior to the UP path management event and from the target PSA after the UP path management event, respectively, wherein the source network element is identified by a source Data Network Access Identifier (DNAI) and the target network element is identified by a target DNAI and receives packets from the target PSA, the source DNAI and the target DNAI corresponding to said changing of the DNAI.

13. The apparatus of claim 1, wherein configuring the one or more UPF entities to support in-order packet delivery comprises configuring a target PSA to: buffer received packets for the traffic flow, the traffic flow being associated with a PDU session; detect receipt of the flow end marker; and, upon detecting receipt of the flow end marker, stop buffering said received packets for the traffic flow and forward said received packets previously buffered to a target network element.

14. The apparatus of claim 1, wherein the UP path management event comprises changing from a source network element to a target network element, each of the source network element and the target network element receiving UL packets of the traffic flow from a same entity of the one or more UPF entities, and wherein configuring the one or more UPF entities comprises: configuring said same entity to transmit the flow end marker to the source network element and to subsequently transmit UL packets to the target network element, the source network element and the target network element corresponding to said changing of the DNAI.

15. A system in a communication network, comprising:
a first apparatus implementing a session management function (SMF) and configured to:

a) receive an indication that in-order packet delivery is requested for a traffic flow;
b) generate or modify information related to a flow end marker to be used in supporting said in-order packet delivery;
wherein the indication that in-order packet delivery is requested is received directly or indirectly from an application function (AF);
c) transmit, to the AF, the generated or modified information related to the flow end marker using an SMF notification; and
d) based on the indication, configure one or more user plane (UP) entities to support in-order packet delivery during a UP path management event related to the traffic flow, wherein the UP path management event comprises changing of a data network address identifier (DNAI) associated with an application, the communication network coupling the application with a mobile UE, wherein said configuring comprises providing at least one of the UP entities with said information related to the flow end marker or providing at least one of the UP entities with further information derived from said information related to the flow end marker; and
one or more of the UP entities.

16. The system of claim 15, wherein the one or more UP entities of the system include a first UP entity configured to:
receive, from the SMF, said information related to the flow end marker, said information related to the flow end marker instructing the first UP entity to transmit the flow end marker to a second UP entity; and
according to said information related to the flow end marker, transmit the flow end marker to the second UP entity.

17. The system of claim 16, wherein the one or more of the UP entities of the system include the second UP entity, wherein the second UP entity is configured to:
receive, from the SMF, said information related to the flow end marker or further information related to the flow end marker, the flow end marker associated with a traffic flow, the traffic flow being associated with a protocol data unit (PDU) session; and
according to said information related to the flow end marker or said further information related to the flow end marker, transmit the flow end marker to a source network element.

18. The system of claim 15, wherein the one or more of the UP entities in the system include a further UP entity configured to:
receive, from the SMF, said information related to the flow end marker or further information related to the flow end marker, the flow end marker associated with a traffic flow, the traffic flow being associated with a protocol data unit (PDU) session;
detect receipt of the flow end marker from a source UP entity;
upon detection of the flow end marker, forward, toward a target network element, packets of the traffic flow which are received and buffered by the further UP entity; and
after forwarding all of the packets of the traffic flow which are received and buffered by the further UP entity, forward further packets of the traffic flow toward the target network element.

19. The system of claim 18, wherein the one or more of the UP entities in the system include the source UP entity.

20. A method comprising:
receiving, by a session management function (SMF), an indication that in-order packet delivery is requested for a traffic flow;
generating or modifying, by the SMF, information related to a flow end marker to be used in supporting said in-order packet delivery;
wherein the indication that in-order packet delivery is requested is received directly or indirectly from an application function (AF);
transmitting, to the AF, the generated or modified information related to the flow end marker using an SMF notification; and
based on the indication, configuring, by the SMF, one or more user plane (UP) entities to support in-order packet delivery during a UP path management event related to the traffic flow, wherein the UP path management event comprises changing of a data network address identifier (DNAI) associated with an application, the communication network coupling the application with a mobile UE, wherein said configuring comprises providing at least one of the UP entities with said information related to the flow end marker or providing at least one of the UP entities with further information derived from said information related to the flow end marker.

* * * * *